(12) United States Patent
Furukawa et al.

(10) Patent No.: US 11,507,759 B2
(45) Date of Patent: Nov. 22, 2022

(54) SPEECH TRANSLATION DEVICE, SPEECH TRANSLATION METHOD, AND RECORDING MEDIUM

(71) Applicant: Panasonic Corporation, Osaka (JP)

(72) Inventors: Hiroki Furukawa, Osaka (JP); Atsushi Sakaguchi, Kyoto (JP); Tsuyoki Nishikawa, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 162 days.

(21) Appl. No.: 16/824,110

(22) Filed: Mar. 19, 2020

(65) Prior Publication Data

US 2020/0311354 A1 Oct. 1, 2020

Related U.S. Application Data

(60) Provisional application No. 62/823,197, filed on Mar. 25, 2019.

(30) Foreign Application Priority Data

Oct. 29, 2019 (JP) .............................. JP2019-196078

(51) Int. Cl.
*G06F 40/58* (2020.01)
*G10L 15/04* (2013.01)
(Continued)

(52) U.S. Cl.
CPC .......... *G06F 40/58* (2020.01); *G06F 3/04842* (2013.01); *G06F 3/167* (2013.01);
(Continued)

(58) Field of Classification Search
CPC ........... G06F 2203/04803; G06F 40/58; G06F 3/167; G06F 9/542; G06F 3/04842; G10L 13/00; G10L 15/04; G10L 15/26
See application file for complete search history.

(56) References Cited

U.S. PATENT DOCUMENTS 9,860,652 B2 * 1/2018 Cole ....................... H04R 25/30
2004/0267527 A1 * 12/2004 Creamer ............. G10L 19/0018
704/235

(Continued)

FOREIGN PATENT DOCUMENTS

JP 3891023 3/2007

*Primary Examiner* — Michael Colucci
(74) *Attorney, Agent, or Firm* — Wenderoth, Lind & Ponack, L.L.P.

(57) ABSTRACT

A speech translation device, for conversation between a first speaker making an utterance in a first language and a second speaker making an utterance in a second language different from the first language, includes: a speech detector that detects, from sounds that are input, a speech segment in which the first speaker or the second speaker made an utterance; a display that, after speech recognition is performed on the utterance, displays a translation result obtained by translating the utterance from the first language to the second language or from the second language to the first language; and an utterance instructor that outputs, in the second language via the display, a message prompting the second speaker to make an utterance after a first speaker's utterance or outputs, in the first language via the display, a message prompting the first speaker to make an utterance after a second speaker's utterance.

16 Claims, 13 Drawing Sheets

(51) Int. Cl.
  *G10L 15/26* (2006.01)
  *G06F 3/16* (2006.01)
  *G06F 3/04842* (2022.01)
  *G06F 9/54* (2006.01)
  *G10L 13/00* (2006.01)
(52) U.S. Cl.
  CPC .............. *G06F 9/542* (2013.01); *G10L 13/00* (2013.01); *G10L 15/04* (2013.01); *G10L 15/26* (2013.01); *G06F 2203/04803* (2013.01)

(56) References Cited

U.S. PATENT DOCUMENTS

| | | | |
|---|---|---|---|
| 2005/0071196 A1* | 3/2005 | Del Pin .................. | G06Q 10/10 705/2 |
| 2008/0175225 A1* | 7/2008 | Chu ...................... | H04M 7/003 370/352 |
| 2009/0310811 A1* | 12/2009 | Inoda .................... | H04R 1/083 381/362 |
| 2011/0055256 A1* | 3/2011 | Phillips .................. | G10L 15/30 707/769 |
| 2011/0134910 A1* | 6/2011 | Chao-Suren ...... | H04M 3/42391 704/277 |
| 2015/0161370 A1* | 6/2015 | North ...................... | G07C 9/37 726/5 |
| 2017/0061990 A1* | 3/2017 | Otani ..................... | G11B 27/34 |
| 2019/0392830 A1* | 12/2019 | Abdollahian ......... | G06F 40/295 |
| 2021/0235189 A1* | 7/2021 | Secall .................... | H04S 1/002 |

* cited by examiner

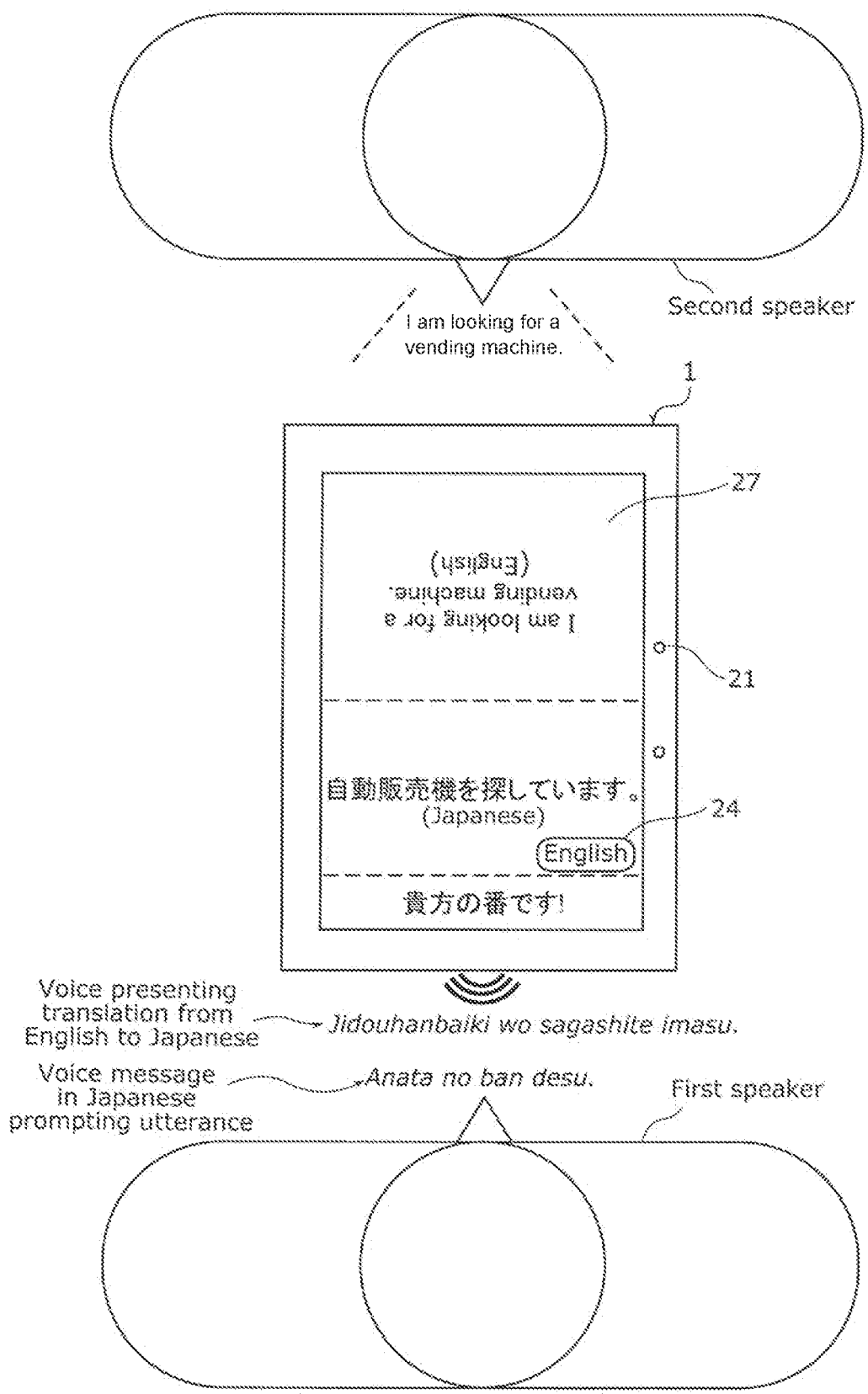

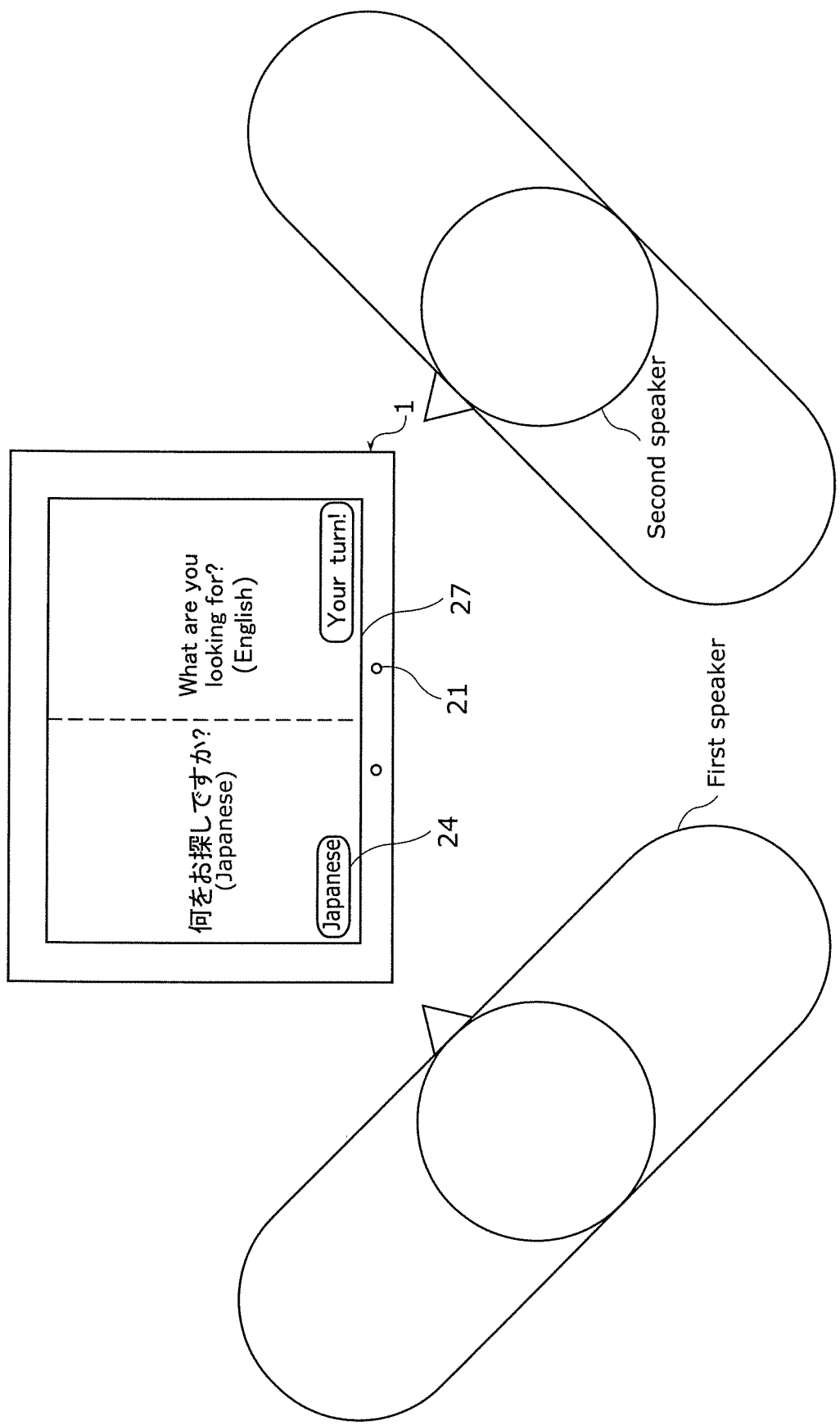

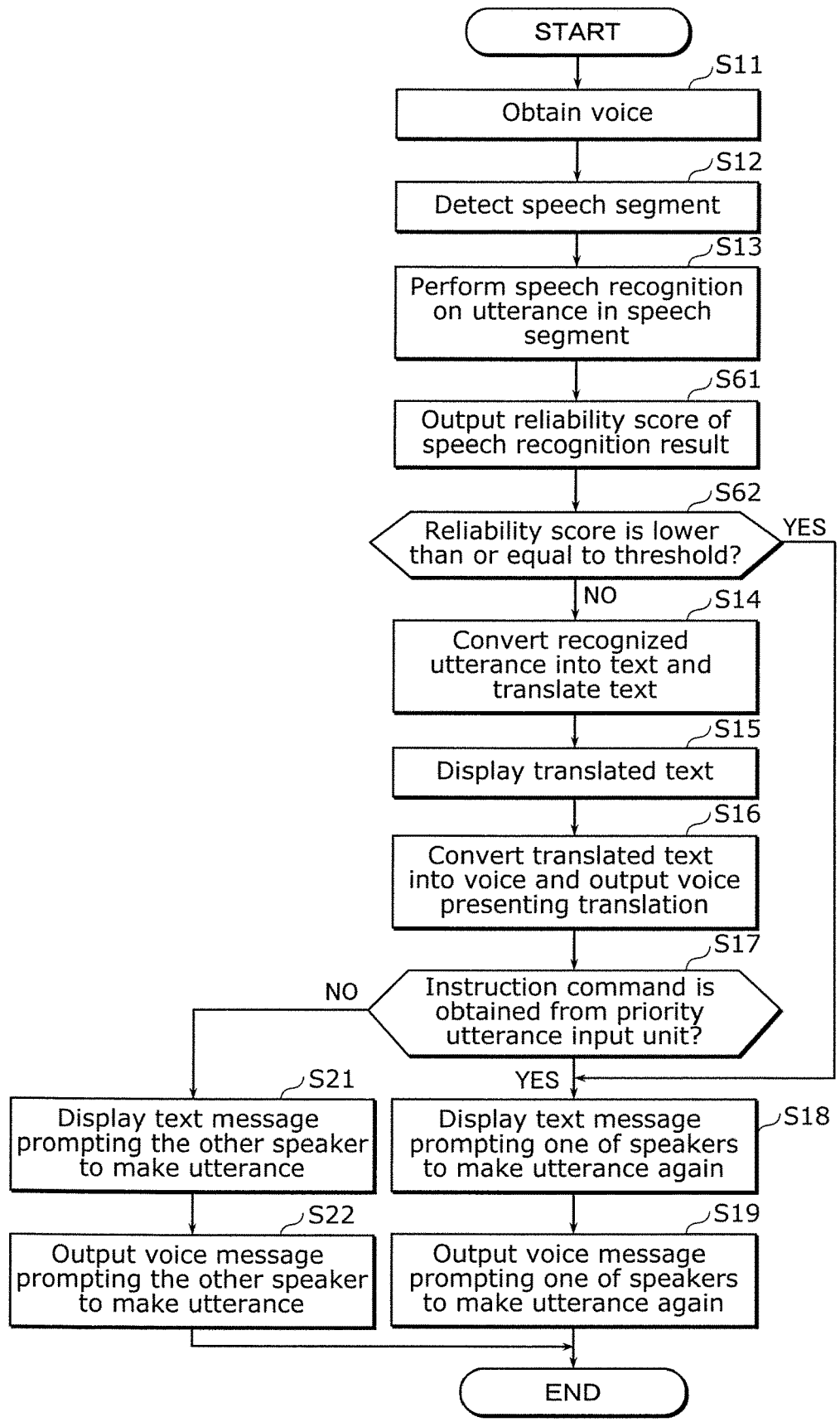

SPEECH TRANSLATION DEVICE, SPEECH TRANSLATION METHOD, AND RECORDING MEDIUM

CROSS REFERENCE TO RELATED APPLICATIONS

The present application is based on and claims priority of Japanese Patent Application No. 2019-196078 filed on Oct. 29, 2019 and U.S. Provisional Patent Application No. 62/823,197 filed on Mar. 25, 2019. The entire disclosures of the above-identified applications, including the specifications, drawings and claims are incorporated herein by reference in its entirety.

FIELD

One or more exemplary embodiments disclosed herein relate generally to a speech translation device, a speech translation method, and a recording medium.

BACKGROUND

For example, Patent Literature (PTL) 1 discloses a translation system including: an audio input unit that converts, into voice data, an utterance made by a first language speaker or a second language speaker who is a conversation partner of the first language speaker, and outputs the voice data; an input switch that is turned on while the first language speaker makes an utterance and continues being turned on even while the first language speaker is not making any utterance; and an audio output unit that converts, into voice, a result obtained by translating the voice data that has been input, and outputs the voice presenting the translation.

CITATION LIST

Patent Literature

PTL 1: Japanese Patent No. 3891023

SUMMARY

Technical Problem

With the technologies disclosed in PTL 1, however, when a first speaker and a second speaker hold a conversation, each of the first speaker and the second speaker needs to operate an input switch every time the speaker makes an utterance, and this makes the operation burdensome for the speakers. Since the first speaker and the second speaker have to operate the input switch so frequently during the conversation that a frequency at which and the length of time during which the speakers use the translation system increase.

Moreover, when the first speaker and the second speaker operate the translation system, a speaker who is not the owner of the translation system normally does not understand how to operate the system. Accordingly, it takes time for such a speaker to operate the translation system, and this further increases a usage time during which the translation system is used. As a result, the conventional translation system causes a problem that a large amount of energy is spent due to the increase in the usage time.

In view of this, one non-limiting and exemplary embodiment provides a speech translation device, a speech translation method, and a recording medium that are capable of reducing an increase in the energy consumed by the speech translation device by simplifying the operation of the device.

Solution to Problem

In one general aspect, the techniques disclosed here feature a speech translation device, for conversation between a first speaker who makes an utterance in a first language and a second speaker who makes an utterance in a second language different from the first language, which includes: a speech detector that detects, from sounds that are input to an audio input unit, a speech segment in which the first speaker or the second speaker has made an utterance; a display that, after speech recognition is performed on the utterance in the speech segment detected by the speech detector, displays a translation result obtained by translating the utterance from the first language to the second language or a translation result obtained by translating the utterance from the second language to the first language; and an utterance instructor that outputs, in the second language via the display, a message prompting the second speaker to make an utterance after the first speaker has made an utterance or outputs, in the first language via the display, a message prompting the first speaker to make an utterance after the second speaker has made an utterance.

One of these general and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The speech translation device and so on according to one or more exemplary embodiments or features disclosed herein provides reducing an increase in the energy consumed by the speech translation device by simplifying the operation of the device.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1B is a diagram illustrating an outer appearance of the speech translation device according to Embodiment 1 and an example of a scene in which the first speaker and the second speaker use the speech translation device and the second speaker makes an utterance.

FIG. 1C is a diagram illustrating another example of a scene in which the first speaker and the second speaker use the speech translation device for having a conversation.

FIG. 11 is a flowchart illustrating an operation of the speech translation device according to Embodiment 4.

DESCRIPTION OF EMBODIMENTS

Figure 1A:
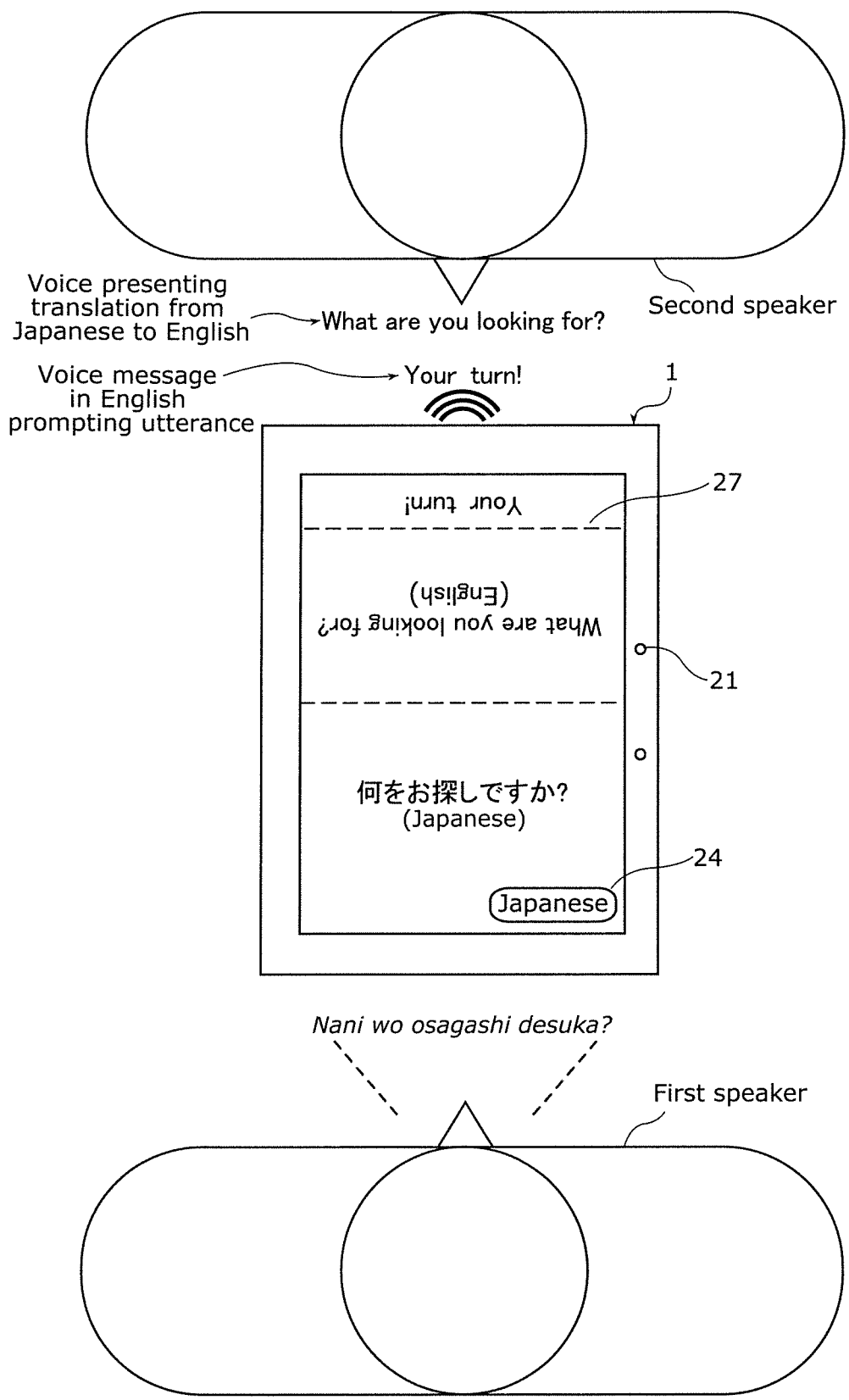
FIG. 1A is a diagram illustrating an outer appearance of a speech translation device according to Embodiment 1 and an example of a scene in which a first speaker and a second speaker use the speech translation device and the first speaker makes an utterance.

According to an exemplary embodiment disclosed herein, a speech translation device, for conversation between a first speaker who makes an utterance in a first language and a second speaker who makes an utterance in a second language different from the first language, includes: a speech detector that detects, from sounds that are input to an audio input unit, a speech segment in which the first speaker or the second speaker has made an utterance; a display that, after speech recognition is performed on the utterance in the speech segment detected by the speech detector, displays a translation result obtained by translating the utterance from the first language to the second language or a translation result obtained by translating the utterance from the second language to the first language; and an utterance instructor that outputs, in the second language via the display, a message prompting the second speaker to make an utterance after the first speaker has made an utterance or outputs, in the first language via the display, a message prompting the first speaker to make an utterance after the second speaker has made an utterance.

Thus, by detecting each of the speech segments in a conversation held between the first speaker and the second speaker, it is possible to obtain a translation result obtained by translating a detected utterance from the first language to the second language or a translation result obtained by translating a detected utterance from the second language to the first language. In other words, with such a speech translation device, it is possible to translate the language of an utterance that has automatically been detected into another language, without any input operation for translation each time the first speaker or the second speaker makes an utterance.

Moreover, the speech translation device is capable of outputting a message prompting the second speaker to make an utterance after the first speaker has made an utterance or outputting a message prompting the first speaker to make an utterance after the second speaker has made an utterance. Accordingly, with such a speech translation device, it is possible for the first speaker or the second speaker to know the timing at which he/she makes an utterance, even without any input operation to start utterance each time the first speaker or the second speaker makes an utterance.

As described above, the speech translation device does not require any input operation to start utterance or to switch between languages, and has excellent operability. In other words, since the speakers hardly have burdensome experience in operating the speech translation device, it is possible to reduce an increase in time during which the speech translation device is used.

Accordingly, with the speech translation device, it is possible to reduce an increase in the energy consumed by the speech translation device by simplifying the operation of the device.

In particular, since it is possible to simplify the operation of the speech translation device, it is also possible to inhibit erroneous operations in operating the device.

According to an exemplary embodiment disclosed herein, a speech translation method, for conversation between a first speaker who makes an utterance in a first language and a second speaker who makes an utterance in a second language different from the first language, includes: detecting, from sounds that are input to an audio input unit, a speech segment in which the first speaker or the second speaker has made an utterance; after performing speech recognition on the utterance in the speech segment detected, displaying on a display a translation result obtained by translating the utterance from the first language to the second language or a translation result obtained by translating the utterance from the second language to the first language; and outputting, in the second language via the display, a message prompting the second speaker to make an utterance after the first speaker has made an utterance, or outputting, in the first language via the display, a message prompting the first speaker to make an utterance after the second speaker has made an utterance.

The same advantageous effects as obtained by the aforementioned speech translation device can be also obtained with the speech translation method.

According to an exemplary embodiment disclosed herein, a recording medium is a non-transitory computer-readable recording medium for use in a computer and has a computer program recorded thereon for causing a computer to execute the speech translation method.

The same advantageous effects as obtained by the aforementioned speech translation device can be also obtained with the recording medium.

In the speech translation device according to another aspect of the present disclosure may further include a priority utterance input unit that, when speech recognition is performed on the utterance made by the first speaker or the second speaker, performs again the speech recognition preferentially on the utterance on which the speech recognition has been performed.

With this, when either the first speaker or the second speaker makes a mistake in making an utterance or when an utterance uncomfortably made is translated in the middle of the utterance, for example, the speaker who has just made an utterance gets priority by operating the priority utterance input unit. Therefore, the speaker who has just made an utterance can have an opportunity to make an utterance again (can restate what has just been stated). This enables the priority utterance input unit to return to the process of performing speech recognition on an utterance made by one of the first speaker and the second speaker even though the process has proceeded to the process for performing speech recognition on an utterance made by the other of the first speaker and the second speaker after the speech recognition performed on the utterance made by one of the speakers. This enables the speech translation device to surely obtain an utterance made by the first speaker or the second speaker.

It is therefore possible for the speech translation device to output a translation result obtained by translating the utterance.

The speech translation device according to another aspect of the present disclosure further includes: the audio input unit to which a voice of the utterance made by the first speaker or the second speaker in the conversation is input; a speech recognizer that performs speech recognition on the utterance in the speech segment detected by the speech detector, to convert the utterance into text; a translator that translates the text into which the utterance has been converted by the speech recognizer, from the first language to the second language or from the second language to the first language; and an audio output unit that outputs by voice a result of the translation made by the translator.

With this, it is possible to firstly perform speech recognition on an utterance that is input and then translate the language of the utterance into another language. In other words, the speech translation device is capable of performing the process starting from the obtainment of an utterance in the conversation between the first speaker and the second speaker up to the output of a result obtained by translating the utterance. Therefore, even without any communication with an external server, the speech translation device is capable of translating an utterance made by the first speaker and an utterance made by the second speaker one after the other in the conversation between the first speaker and the second speaker. Thus, the speech translation device is applicable in the environment where the speech translation device has difficulty in communicating with an external server.

In the speech translation device according to another aspect of the present disclosure, the audio input unit comprises a plurality of audio input units, and the speech translation device further includes: a first beam former that performs signal processing on a voice that is input to at least one of the plurality of audio input units, to cause directivity of sound collection to coincide with a sound source direction of the utterance made by the first speaker; a second beam former that performs signal processing on the voice that is input to at least one of the plurality of audio input units, to cause directivity of sound collection to coincide with a sound source direction of the utterance made by the second speaker; an input switch that switches between obtaining an output signal from the first beam former and obtaining an output signal from the second beam former; and a sound source direction estimator that estimates a sound source direction by performing signal processing on the voice that is input to the plurality of audio input units, and the utterance instructor causes the input switch to switch between the obtaining of an output signal from the first beam former and the obtaining of an output signal from the second beam former.

In this way, the sound source direction estimator is capable of estimating a relative direction in which a speaker is located with respect to the speech translation device. This enables the input switch to switch to either an output signal from the first beam former or an output signal from the second beam former that is appropriately directed to a speaker. In other words, since it is possible to cause the directivity of sound collection by a beam former to coincide with a sound source direction of an utterance made by the first speaker or the second speaker, the speech translation device is capable of reducing the surrounding noise to collect the sound of the utterance.

In the speech translation device according to another aspect of the present disclosure, the audio input unit comprises a plurality of audio input units, and the speech translation device further includes: a sound source direction estimator that estimates a sound source direction by performing signal processing on a voice that is input to the plurality of audio input units; and a controller that causes the display to display the first language in a display area corresponding to a location of the first speaker with respect to the speech translation device, and display the second language in a display area corresponding to a location of the second speaker with respect to the speech translation device. The controller: compares a display direction and the sound source direction estimated by the sound source direction estimator, the display direction being a direction from the display of the speech translation device to the first speaker or the second speaker and being a direction for either one of the display areas of the display; causes the speech recognizer and the translator to operate when the display direction substantially coincides with the sound source direction estimated; and causes the speech recognizer and the translator to stop when the display direction is different from the sound source direction estimated.

Thus, when the display direction of a language displayed in a display area of the display substantially coincides with a sound source direction of an utterance made by a speaker, it is possible to specify whether the speaker is the first speaker who makes an utterance in the first language or the second speaker who makes an utterance in the second language. In this case, it is possible to perform speech recognition in the first language on an utterance made by the first speaker and perform speech recognition in the second language on an utterance made by the second speaker. When the display direction is different from the sound source direction, by stopping the translation of an input utterance, it is possible to inhibit the input utterance from being untranslated or mistranslated.

This enables the speech translation device to surely perform speech recognition on an utterance made in the first language or an utterance made in the second language, and this in turn makes it possible to surely translate the utterance. As a result, the speech translation device is capable of reducing an increase in the amount of processing performed by the speech translation device.

In the speech translation device according to another aspect of the present disclosure, when the controller causes the speech recognizer and the translator to stop, the utterance instructor outputs again a message prompting utterance in a specified language.

In this way, even when the display direction is different from the sound source direction, with the utterance instructor outputting again a message prompting utterance, a target speaker makes an utterance. This enables the speech translation device to surely obtain the utterance made by the target speaker, and therefore, the speech translation device is capable of more surely translating the utterance.

In the speech translation device according to another aspect of the present disclosure, when the display direction is different from the sound source direction estimated, the utterance instructor outputs again a message prompting utterance in a specified language after a specified period of time has elapsed since the comparison made by the controller.

Thus, by comparing a display direction and a sound source direction and subsequently allowing a specified period of time to pass, it is possible to inhibit an utterance made by the first speaker and an utterance made by the second speaker from being input in a mixed manner. In this way, by outputting again a message prompting utterance after the specified period of time has elapsed, a target speaker makes an utterance. This enables the speech translation device to surely obtain the utterance made by the target speaker, and therefore, the speech translation device is capable of more surely translating the utterance.

In the speech translation device according to another aspect of the present disclosure, the audio input unit comprises a plurality of audio input units, and the speech translation device further includes: a first beam former that performs signal processing on a voice that is input to at least one of the plurality of audio input units, to cause directivity of sound collection to coincide with a sound source direction of the utterance made by the first speaker; a second beam former that performs signal processing on the voice that is input to at least one of the plurality of audio input units, to cause directivity of sound collection to coincide with a sound source direction of the utterance made by the second speaker; and a sound source direction estimator that estimates a sound source direction by performing signal processing on the voice that is input to the plurality of audio input units.

This enables the sound source direction estimator to estimate a relative direction in which a speaker is located with respect to the speech translation device. The sound source direction estimator therefore performs signal processing on an output signal from the first beam former or an output signal from the second beam former that is appropriately directed to a speaker, and this reduces computational cost required for the signal processing.

In the speech translation device according to another aspect of the present disclosure, the utterance instructor: outputs, in the first language via the display, the message prompting the first speaker to make an utterance when the speech translation device is activated; and outputs, in the second language via the display, the message prompting the second speaker to make an utterance after the utterance made by the first speaker is translated from the first language to the second language and a result of the translation is displayed on the display.

Thus, by registering in advance that the second speaker makes an utterance in the second language after the first speaker has made an utterance in the first language and outputting, in the first language, a message prompting the first speaker to make an utterance when the speech translation device is activated, the first speaker is able to start utterance. This inhibits mistranslation caused by the second speaker making an utterance in the second language when the speech translation device is activated.

In the speech translation device according to another aspect of the present disclosure, after a start of the translation, the utterance instructor causes the audio output unit to output, a specified number of times, a voice message for prompting utterance, and after the audio output unit has output the voice message the specified number of times, the utterance instructor causes the display to display a message for prompting utterance.

In this way, by outputting, up to a specified number of times, a voice message for prompting utterance, it is possible to reduce an increase in the energy consumed by the speech translation device.

In the speech translation device according to another aspect of the present disclosure, the speech recognizer outputs a result of the speech recognition performed on the utterance and a reliability score of the result, and when the reliability score obtained from the speech recognizer is lower than or equal to a threshold, the utterance instructor outputs a message prompting utterance via at least one of the display or the audio output unit, without translating the utterance whose reliability score is lower than or equal to the threshold.

In this way, when a reliability score indicating the accuracy of speech recognition is lower than or equal to a threshold, with the utterance instructor outputting again a message prompting utterance, a target speaker makes an utterance. This enables the speech translation device to surely obtain the utterance made by the target speaker, and therefore, the speech translation device is capable of more surely translating the utterance.

If the audio output unit outputs a message prompting utterance by voice, in particular, a speaker easily notices that speech recognition has not been performed properly on an utterance he/she has made.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiments, those not recited in any one of the independent claims are described as optional elements.

Hereinafter, certain exemplary embodiments are described in greater detail with reference to the accompanying Drawings.

Embodiment 1

[Configuration: Speech Translation Device 1]

FIG. 1A is a diagram illustrating an outer appearance of speech translation device 1 according to Embodiment 1 and an example of a scene in which a first speaker and a second speaker use speech translation device 1 and the first speaker makes an utterance. FIG. 1B is a diagram illustrating an outer appearance of speech translation device 1 according to Embodiment 1 and an example of a scene in which the first speaker and the second speaker use speech translation device 1 and the second speaker makes an utterance.

As illustrated in FIG. 1A and FIG. 1B, speech translation device 1 is a device that bidirectional translates conversation between the first speaker who makes an utterance in a first language and the second speaker who makes an utterance in a second language different from the first language. In other words, speech translation device 1 recognizes the language of an utterance (uttered voice) made by the first speaker or the second speaker, out of the two languages, that is, one language spoken by the first speaker and the other language spoken by the second speaker, and translates the language of an utterance made by one of the speakers into the language spoken by the other speaker. For example, speech translation device 1 translates an utterance made by the first speaker from the first language to the second language and outputs the translated utterance, or translates an utterance made by the second speaker from the second language to the first language and outputs the translated utterance. The first language and the second language are, for example, Japanese, English, French, German, Chinese, etc.

FIG. 1A and FIG. 1B of the present embodiment each illustrates how a single first speaker and a single second speaker have a conversation face to face. It should be noted that speech translation device 1 may be used for communication among a plurality of first speakers and a plurality of second speakers.

The first speaker and the second speaker may have a conversation face to face or side by side as illustrated in FIG. 1C, using speech translation device 1. FIG. 1C is a diagram illustrating another example of a scene in which the first speaker and the second speaker use speech translation device 1 for having a conversation. In this case, speech translation device 1 may change the mode of display. Such speech translation device 1 is disposed vertically or laterally for use, as illustrated in FIG. 1A, FIG. 1B, or FIG. 1C, depending on how the speakers position themselves for communication.

Speech translation device 1 is a portable terminal such as a smartphone or a tablet terminal that is portable by the first speaker.

Figure 2:
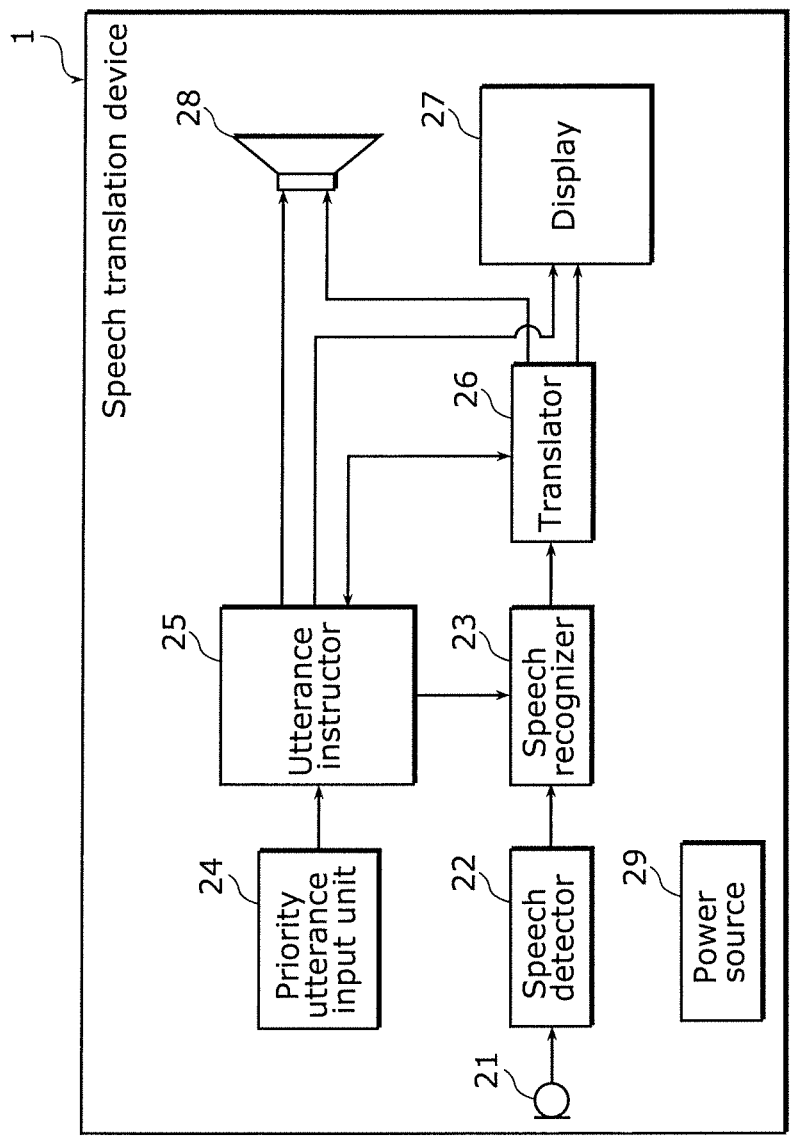
FIG. 2 is a block diagram illustrating the speech translation device according to Embodiment 1.

FIG. 2 is a block diagram illustrating speech translation device 1 according to Embodiment 1.

As illustrated in FIG. 2, speech translation device 1 includes audio input unit 21, speech detector 22, priority utterance input unit 24, utterance instructor 25, speech recognizer 23, translator 26, display 27, audio output unit 28, and power source 29.

[Audio Input Unit 21]

Audio input unit 21 is a microphone to which voices are input when the first speaker and the second speaker have a conversation, and is communicably connected to speech detector 22. In other words, audio input unit 21 obtains a voice (collects a sound), converts the obtained voice into an electrical signal, and outputs an acoustic signal which is the electrical signal into which the voice has been converted. The acoustic signal obtained by audio input unit 21 may be stored into storage, for instance.

Audio input unit 21 may be configured as an adaptor. In such a case, audio input unit 21 functions after a microphone is attached to speech translation device 1, and obtains an acoustic signal obtained by the microphone.

[Speech Detector 22]

Speech detector 22 detects, from sounds that are input to audio input unit 21, a speech segment in which the first speaker or the second speaker has made an utterance, and is communicably connected to audio input unit 21 and speech recognizer 23. Specifically, speech detector 22 determines, based on a sound volume indicated by an acoustic signal obtained from audio input unit 21, a moment when the sound volume increases or decreases as an interval between utterances, and detects the starting point and the ending point of a speech segment in the acoustic signal (utterance end detection). The speech segment here indicates the voice of one utterance made by a speaker, but may include a period from the starting point to the ending point of the voice of one utterance.

Speech detector 22 detects, from the acoustic signal, a speech segment detected, i.e., each of the utterances made in the conversation between the first speaker and the second speaker, and outputs voice information indicating a detected utterance.

[Utterance Instructor 25]

Utterance instructor 25 outputs, in the second language via display 27, a message prompting the second speaker to make an utterance after the first speaker has made an utterance or outputs, in the first language via display 27, a message prompting the first speaker to make an utterance after the second speaker has made an utterance. In other words, utterance instructor 25 outputs, to display 27, utterance instructing text information which is a message prompting the first speaker or the second speaker to make an utterance at his/her timing, to facilitate conversation between the first speaker and the second speaker. Utterance instructor 25 also outputs, to audio output unit 28, utterance instructing voice information which is a message prompting the first speaker or the second speaker to make an utterance. In this case, utterance instructor 25 outputs, to audio output unit 28, the utterance instructing voice information which indicates the same contents as those indicated in the utterance instructing text information that is output to display 27. It should be noted that utterance instructor 25 does not need to output the utterance instructing voice information to audio output unit 28, and outputting a voice message prompting utterance is not a must.

The utterance instructing text information here is a text indicating a message prompting the first speaker or the second speaker to make an utterance. The utterance instructing voice information here is a voice indicating a message prompting the first speaker or the second speaker to make an utterance.

Utterance instructor 25 outputs an instruction command for translator 26 to translate the first language into the second language or the second language into the first language. When the second speaker makes an utterance after the first speaker has made an utterance, for example, utterance instructor 25 outputs, to speech recognizer 23, an instruction command for performing speech recognition in the second language on the utterance made by the second speaker, and outputs, to translator 26, an instruction command for translating the utterance on which the speech recognition has been performed from the second language to the first language. The same applies to the case where the first speaker makes an utterance after the second speaker has made an utterance.

After one of the first speaker and the second speaker has made an utterance, utterance instructor 25 outputs, to display 27, utterance instructing text information which is a message prompting the other of the first speaker and the second speaker to make an utterance. At the point in time when or after translator 26 outputs a translation result obtained by translating the utterance made by one of the speakers, utterance instructor 25 outputs utterance instructing text information to display 27 and outputs utterance instructing voice information to audio output unit 28.

Upon obtaining an instruction command from priority utterance input unit 24 to be described later on, utterance instructor again outputs, to display 27, utterance instructing text information which is a message prompting the last speaker who has just made an utterance to make an utterance, and outputs utterance instructing voice information to audio output unit 28.

When speech translation device 1 is activated, utterance instructor 25 outputs, in the first language via display 27, a message prompting the first speaker to make an utterance. In other words, when the first speaker is the owner of speech translation device 1, utterance instructor 25 prompts the first speaker to start utterance. Moreover, utterance instructor 25 outputs, in the second language via display 27, a message prompting the second speaker to make an utterance after the utterance made by the first speaker is translated from the first language to the second language and a result of the translation is displayed on display 27. After the utterance made by the first speaker in the first language has been translated into the second language, the second speaker makes an utterance in the second language, and the second language uttered is translated into the first language. Repeating this process facilitates conversation between the first speaker and the second speaker.

After the start of the translation, utterance instructor 25 causes audio output unit 28 to output, a specified number of times, a voice message for prompting utterance. In other words, since there is sometimes a case where the second speaker does not make an utterance sooner enough or fails to understand what the first speaker has said, utterance instructor 25 outputs, a specified number of times, a voice message for prompting utterance. After having output the voice message the specified number of times, utterance instructor 25 causes display 27 to display a message for prompting utterance. In other words, when no effect is observed even after the voice message is output the specified number of times, utterance instructor 25 causes display 27 to display a message prompting utterance, to inhibit the consumption of power.

Utterance instructor 25 is communicably connected to speech recognizer 23, priority utterance input unit 24, translator 26, display 27, and audio output unit 28.

[Priority Utterance Input Unit 24]

When the first speaker or the second speaker makes an utterance and speech recognition has been performed on the utterance, priority utterance input unit 24 is capable of causing speech recognizer 23 to perform again the speech recognition preferentially (or continuously) on the utterance that has been made by the first speaker or the second speaker. In other words, priority utterance input unit 24 is capable of giving an opportunity to make an utterance again to the first speaker or the second speaker who has just made an utterance and whose utterance has been subjugated to speech recognition. Stated differently, priority utterance input unit 24 is capable of returning the process back to the process of performing speech recognition on an utterance made by one of the first speaker and the second speaker even though the process has already proceeded to the process for performing speech recognition on an utterance made by the other of the first speaker and the second speaker after the speech recognition performed on the utterance made by one of the speakers.

Priority utterance input unit 24 receives an input from an operator of speech translation device 1. There is sometimes a case where a speaker who has just made an utterance desires to make an utterance again, such as a case where the speaker made a mistake in making an utterance, a case where an utterance uncomfortably made was translated in the middle of the utterance, or a case where speech translation device 1 recognizes that an utterance is ended when an interval during which no utterance is detected continues over a predetermined length of time. Priority utterance input unit 24 therefore causes speech recognizer 23 to perform speech recognition preferentially on an utterance of a speaker who has just made an utterance and also causes translator 28 to translate the utterance. With this, priority utterance input unit 24 again outputs, to utterance instructor 25, an instruction command for causing utterance instructor 25 to output utterance instructing text information and utterance instructing voice information which are each a message prompting utterance. Although the operator is one of the first speaker and the second speaker, it is mainly the first speaker in the present embodiment.

In the present embodiment, priority utterance input unit 24 is a touch sensor provided with display 27 of speech translation device 1 in an integrated manner. In this case, an operation button serving as priority utterance input unit 24 to receive an operation input by one of the speakers may be displayed on display 27 of speech translation device 1.

In the present embodiment, when speech recognizer 23 switches a recognition language from the first language to the second language, priority utterance input unit 24 which is a priority button for the first language is displayed on display 27 so that speech recognition and translation are performed preferentially on the first language which is the previous language before the switching. When speech recognizer 23 switches the recognition language from the second language to the first language, priority utterance input unit 24 which is a priority button for the second language is displayed on display 27 so that speech recognition and translation are performed preferentially on the second language which is the previous language before the switching. Such a priority button is displayed on display 27 at least after translation is ended.

[Speech Recognizer 23]

After performing speech recognition on an utterance in a speech segment detected by speech detector 22, speech recognizer 23 converts the utterance into text. Specifically, upon obtaining voice information indicating the utterance in the speech segment detected by speech detector 22, speech recognizer 23 performs speech recognition on the utterance indicated in the voice information. When the utterance indicated in the voice information is in the first language, for example, speech recognition is performed on the utterance in the first language, whereas when the utterance is in the second language, speech recognition is performed on the utterance in the second language. When performing speech recognition on the utterance in the first language, speech recognizer 23 generates a first text indicating the utterance on which the speech recognition has been performed and outputs the generated first text to translator 26. When performing speech recognition on the utterance in the second language, speech recognizer 23 generates a second text indicating the utterance on which the speech recognition has been performed and outputs the generated second text to translator 26.

[Translator 26]

Translator 26 is a translating device that translates a text resulting from conversion performed by speech recognizer 23, from the first language to the second language or from the second language to the first language. Specifically, upon obtaining a first text which is the text, from speech recognizer 23, translator 26 translates the first text from the first language to the second language. In other words, translator 26 generates a second translated text by translating the first text into the second language. Upon obtaining a second text which is the text, from speech recognizer 23, translator 26 translates the second text from the second language to the first language. In other words, translator 26 generates a first translated text by translating the second text into the first language.

Here, the contents of the first text presented in the first language matches the contents of the second translated text presented in the second language. Similarly, the contents of the second text presented in the second language matches the contents of the first translated text presented in the first language.

After having generated the second translated text, translator 26 recognizes what is presented in the second translated text and generates a translation voice, in the second language, indicating the second translated text that has been recognized. After having generated the first translated text, translator 26 recognizes what is presented in the first translated text and generates a translation voice, in the first language, indicating the first translated text that has been recognized. It is to be noted that the generation of a translation voice based on the first translated text or the second translated text may be performed by audio output unit 28.

Upon generating the second translated text or the first translated text, translator 26 outputs the generated second translated text or first translated text to display 27. Upon generating a translation voice in the second language or in the first language, translator 26 outputs the generated translation voice in the second language or in the first language to audio output unit 28.

Translator 26 is communicably connected to utterance instructor 25, speech recognizer 23, display 27, and audio output unit 28.

[Display 27]

Display 27 is, for example, a monitor such as a liquid-crystal panel or an organic EL panel and is communicably connected to utterance instructor 25 and translator 26. Specifically, when speech recognition is performed on an utterance in a speech segment detected by speech recognizer 22, display 27 displays a translation result obtained by translating the utterance from the first language to the second language or a translation result obtained by translating the utterance from the second language to the first language. Display 27 displays the first text, the second text, the first translated text, and the second translated text which are obtained from translator 26. Display 27 also displays utterance instructing text information which is a message prompting the first speaker or the second speaker to make an utterance after or at the same time when these texts have been displayed.

It is to be noted that display 27 changes a screen layout for displaying a text according to the positional relationship between the first speaker and the second speaker with respect to speech translation device 1. As illustrated in FIG. 1A and FIG. 1B, when the first speaker makes an utterance, for example, display 27 displays a first text on which speech recognition has been performed, in a display area of display 27 located on the side of the first speaker, and displays a second translated text into which the first text has been translated, in a display area of display 27 located on the side of the second speaker. When the second speaker makes an utterance, display 27 displays a second text on which speech recognition has been performed, in a display area of display 27 located on the side of the second speaker, and displays a first translated text into which the second text has been translated, in a display area of display 27 located on the side of the first speaker. In these cases, display 27 displays the first text and the second translated text in such a manner that the letters of the first text are displayed in a direction opposite to a direction in which the letters of the second translated text are displayed. Likewise, display 27 displays the first translated text and the second text in such a manner that the letters of the second text are displayed in a direction opposite to a direction in which the letters of the first translated text are displayed. It should be noted that when the first speaker and the second speaker have a conversation side by side, as illustrated in FIG. 1C, display 27 displays the first text and the second text in such a manner that a direction in which the letters of the first text are displayed is the same as a direction in which the letters of the second text are displayed.

[Audio Output Unit 28]

Audio output unit 28 is a loudspeaker that obtains, from translator 26, a translation voice which is the result of a translation made by translator 26, outputs the obtained translation voice, and is communicably connected to translator 26 and utterance instructor 25. In other words, when the first speaker makes an utterance, audio output unit 28 plays back and outputs a translation voice presenting the same contents as those indicated in the second translated text displayed on display 27. When the second speaker makes an utterance, audio output unit 28 plays back and outputs a translation voice presenting the same contents as those indicated in the first translated text displayed on display 27.

Upon obtaining utterance instructing voice information, audio output unit 28 plays back and outputs, to the first speaker or the second speaker, a voice presenting a message prompting utterance which is indicated in the utterance instructing voice information. After having output the translation voice presenting the first translated text or the second translated text, audio output unit 28 plays back and outputs a voice message indicated in the utterance instructing voice information.

[Power Source 29]

Power source 29 includes, for example, primary cells or secondary cells and is electrically connected, via wirings, to audio input unit 21, speech detector 22, priority utterance input unit 24, utterance instructor 25, speech recognizer 23, translator 26, display 27, and audio output unit 28. Power source 29 supplies power to speech detector 22, priority utterance input unit 24, utterance instructor 25, speech recognizer 23, translator 26, display 27, and audio output unit 28.

[Operation]

An operation performed by speech translation device 1 configured as above will be described with reference to FIG. 3.

Figure 3:
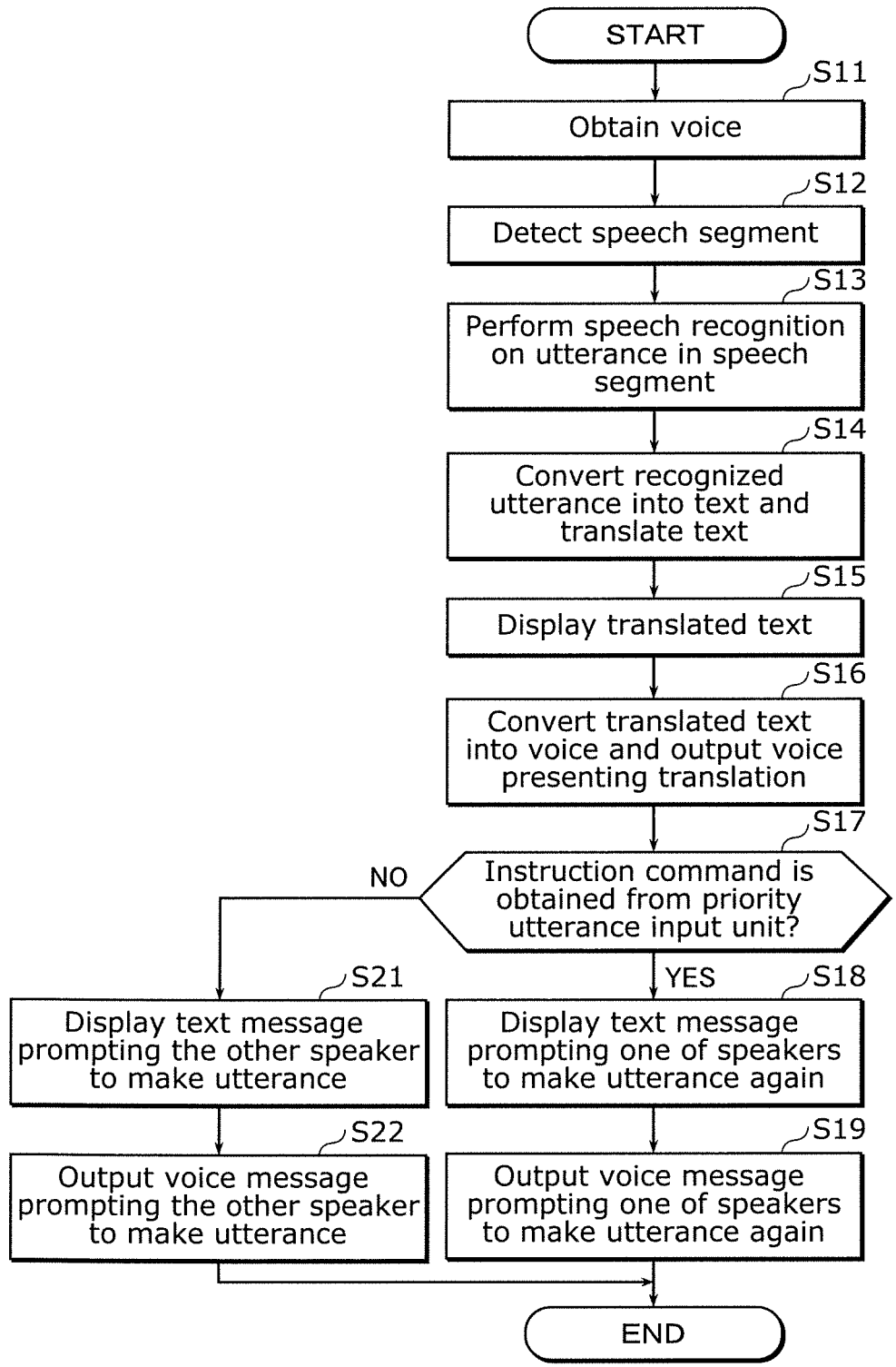
FIG. 3 is a flowchart illustrating an operation of the speech translation device according to Embodiment 1.

FIG. 3 is a flowchart illustrating the operation performed by speech translation device 1 according to Embodiment 1.

Speech translation device 1 sets in advance that the first speaker makes an utterance in the first language and the second speaker makes an utterance in the second language. Here, it is assumed that one of the first speaker and the second speaker starts utterance. Upon being activated by the first speaker, speech translation device 1 starts translating conversation between the first speaker and the second speaker.

First, when the first speaker and the second speaker hold a conversation, speech translation device 1 is activated before an utterance is made. Speech translation device 1 obtains a voice (S11) and generates an acoustic signal indicating the obtained voice. In the present embodiment, when one of the speakers starts utterance, speech translation device 1 obtains a voice of an utterance made by that speaker. When one of the speakers is the first speaker and the first speaker makes the utterance "Nani wo osagashi desuka?", as illustrated in FIG. 1A, speech translation device 1 obtains the voice of the utterance made. Audio input unit 21 obtains a voice, converts the obtained voice into an electrical signal, and outputs, to speech detector 22, an acoustic signal which is the electrical signal into which the obtained voice has been converted.

Next, upon obtaining the acoustic signal from audio input unit 21, speech detector 22 detects, from the voice indicated in the acoustic signal, a speech segment in which one of the speakers has made an utterance (S12), to extract the utterance in the detected speech segment as the utterance of that speaker. For example, speech detector 22 detects a speech segment in which the first speaker has made the utterance "Nani wo osagashi desuka?" from a voice that is input to audio input unit 21, and extracts the utterance from the detected speech segment, as illustrated in FIG. 1A. Speech detector 22 outputs, to speech recognizer 23, voice information indicating the extracted utterance of the first speaker.

Utterance instructor 25 outputs, to speech recognizer 23, an instruction command for performing speech recognition in the language in which one of the speakers has made an utterance, and outputs, to translator 26, an instruction command for translating, from one language to the other language, the utterance on which speech recognition has been performed. In other words, utterance instructor 25 outputs an instruction command for switching between recognition languages for speech recognition performed by speech recognizer 23 so that speech recognizer 23 is capable of recognizing the language in which one of the speakers makes an utterance. Utterance instructor 25 also outputs an instruction command for switching between translation languages so that translator 26 is capable of making a translation using a desired language based on the language in which speech recognition has been performed by speech recognizer 23.

Upon obtaining the instruction command, speech recognizer 23 switches a recognition language from the second language to the first language or from the first language to the second language. Upon obtaining the instruction command, translator 26 switches a translation language from the second language to the first language or from the first language to the second language.

Next, upon obtaining the instruction command and the voice information, speech recognizer 23 performs speech recognition on the utterance indicated in the voice information. When the language of one of the speakers is the first language, for example, speech recognizer 23 selects the first language as a recognition language and performs speech recognition in the selected first language on the utterance indicated in the voice information. In other words, speech recognizer 23 converts the utterance indicated in the voice information into a text in the first language, and outputs, to translator 26, a first text into which the utterance has been converted. When the language of one of the speakers is the second language, speech recognizer 23 selects the second language as a recognition language and performs speech recognition in the selected second language on the utterance indicated in the voice information. In other words, speech recognizer 23 converts the utterance indicated in the voice information into a text in the second language, and outputs, to translator 26, a second text into which the utterance has been converted.

For example, speech recognizer 23 converts the utterance "Nani wo osagashi desuka?" indicated in the voice information into the first text "何をお探しですか?", as illustrated in FIG. 1A.

Next, upon obtaining a text from speech recognizer 23, translator 26 translates the text from one language out of the first language and the second language to the other language. In other words, if the text is the first text in the first language, translator 26 translates the text into the second language and generates a second translated text which is the result of the translation. If the text is the second text in the second language, translator 26 translates the text into the first language and generates a first translated text which is the result of the translation. For example, translator 26 translates the first text "何をお探しですか?" in the first language into the second language and generates a second translated text "What are you looking for?", as illustrated in FIG. 1A.

Translator 26 then outputs, to display 27, the generated second translated text in the second language or the generated first translated text in the first language. Display 27 displays the second translated text or the first translated text (S15). For example, display 27 displays the second translated text "What are you looking for?", as illustrated in FIG. 1A.

After having generated the second translated text, translator 26 converts the second translated text into voice to generate a translation voice in the second language. After having generated the first translated text, translator 26 converts the first translated text into voice to generate a translation voice in the first language. Translator 26 outputs the generated translation voice in the second language or in the first language to audio output unit 28. Audio output unit 28 outputs the translation voice in the second language or in the first language (S16). For example, audio output unit 28 outputs the second translated text "What are you looking for?" by voice, as illustrated in FIG. 1A. It should be noted that the processes of steps S15 and S16 may be performed at the same time or in a reverse order.

Next, utterance instructor 25 determines whether an instruction command is obtained from priority utterance input unit 24 (S17). When one of the speakers desires to make an utterance again, for example, the operator of speech translation device 1 operates priority utterance input unit 24. With this, upon receiving the operation, priority utterance input unit 24 outputs an instruction command to utterance instructor 25.

When utterance instructor 25 obtains the instruction command from priority utterance input unit 24 (Yes in S17), speech recognizer 23 and translator 26 return to the process of performing speech recognition and translation on an utterance made by one of the speakers even though speech recognizer 23 and translator 26 have ended or stopped the process, or have already proceeded to the process for performing speech recognition on an utterance made by the other speaker. Utterance instructor 25 outputs again utterance instructing text information which is a message prompting one of the speakers to make an utterance, for performing speech recognition preferentially on an utterance made by that speaker whose utterance has just been made and subjugated to speech recognition. Display 27 displays the utterance instructing text information obtained from utterance instructor 25 (S18). Display 27 displays, for example, the utterance instructing text information "Please make an utterance again.".

When utterance instructor 25 obtains the instruction command from priority utterance input unit 24, utterance instructor 25 outputs, to audio output unit 28, utterance instructing voice information which is a message prompting one of the speakers to make an utterance. Audio output unit 28 outputs by voice the utterance instructing voice information obtained from utterance instructor 25 (S19). Audio output unit 28 outputs, for example, the utterance instructing voice information "Please make an utterance again."

In this case, speech translation device 1 may display or output by voice, for instance, a message "Thank you for your patience." to the other speaker, or does not need to output anything. It should be noted that the processes of steps S18 and S19 may be performed at the same time or in a reverse order.

Utterance instructor 25 may also cause audio output unit 28 to output utterance instructing voice information a specified number of times. After audio output unit 28 has output the utterance instructing voice information the specified number of times, utterance instructor 25 may cause display unit 27 to display a message indicated in the utterance instructing voice information.

Speech translation device 1 then ends the operation. Thus, with one of the speakers making an utterance again, speech translation device 1 starts the process from step S11.

In contrast, when utterance instructor 25 does not obtain the instruction command from priority utterance input unit 24 (No in S17), utterance instructor 25 outputs, to display 27, utterance instructing text information which is a message prompting the other speaker to make an utterance. This case applies to the case where, for example, one of the speakers does not need to make an utterance again and an utterance of that speaker is correctly recognized. Display 27 displays the utterance instructing text information obtained from utterance instructor 25 (S21). Display 27 displays, for example, the utterance instructing text information "Your turn!", as illustrated in FIG. 1A.

When utterance instructor 25 does not obtain the instruction command from priority utterance input unit 24, utterance instructor also outputs, to audio output unit 28, utterance instructing voice information which is a message prompting the other speaker to make an utterance. Audio output unit 28 outputs by voice the utterance instructing voice information obtained from utterance instructor 25 (S22). Audio output unit 28 outputs, for example, the utterance instructing voice information "Your turn!". It should be noted that the processes of steps S21 and S22 may be performed at the same time or in a reverse order.

Utterance instructor 25 may cause audio output unit 28 to output, a specified number of times, a voice message for prompting utterance. After audio output unit 28 has output the voice message the specified number of times, utterance instructor 25 may cause display 27 to display a message prompting utterance.

Speech translation device 1 then ends the operation. Thus, with one of the speakers making an utterance again, speech translation device 1 starts the process from step S11.

Thus, with an initial operation performed on speech translation device 1 by the first speaker, speech translation device 1 is capable of translating conversation between the first speaker and the second speaker.

Since the same process is performed in the case where the other of the speakers makes an utterance in response to an utterance made by one of the speakers, the description of the process is omitted.

[Advantageous Effects]

The following describes the advantageous effects obtained with speech translation device 1 according to the present embodiment.

As described above, speech translation device 1 according to the present embodiment is a speech translation device, for conversation between a first speaker who makes an utterance in a first language and a second speaker who makes an utterance in a second language different from the first language, which includes: speech detector 22 that detects, from sounds that are input to audio input unit 21, a speech segment in which the first speaker or the second speaker has made an utterance; display 27 that, after speech recognition is performed on the utterance in the speech segment detected by speech detector 22, displays a translation result obtained by translating the utterance from the first language to the second language or a translation result obtained by translating the utterance from the second language to the first language; and utterance instructor 25 that outputs, in the second language via display 27, a message prompting the second speaker to make an utterance after the first speaker has made an utterance or outputs, in the first language via display 27, a message prompting the first speaker to make an utterance after the second speaker has made an utterance.

Thus, by detecting each of the speech segments in the conversation held between the first speaker and the second speaker, it is possible to obtain a translation result obtained by translating a detected utterance from the first language to the second language or a translation result obtained by translating a detected utterance from the second language to the first language. In other words, with such a speech translation device, it is possible to translate the language of an utterance that has automatically been detected into another language, without any input operation for translation each time the first speaker or the second speaker makes an utterance.

Moreover, speech translation device 1 is capable of outputting a message prompting the second speaker to make an utterance after the first speaker has made an utterance or outputting a message prompting the first speaker to make an utterance after the second speaker has made an utterance.

Accordingly, with such speech translation device 1, it is possible for the first speaker or the second speaker to know the timing at which he/she makes an utterance even without any input operation to start utterance each time the first speaker or the second speaker makes an utterance.

As described above, speech translation device 1 does not require any input operation to start utterance or to switch between languages, and has excellent operability. In other words, since the speakers hardly have burdensome experience in operating speech translation device 1, it is possible to reduce an increase in time during which speech translation device 1 is used.

Accordingly, with speech translation device 1, it is possible to reduce an increase in the energy consumed by speech translation device 1 by simplifying the operation of speech translation device 1. In particular, since it is possible to simplify the operation of speech translation device 1, it is also possible to inhibit erroneous operations in operating speech translation device 1.

The speech translation method according to the present embodiment is a speech translation method for conversation between a first speaker who makes an utterance in a first language and a second speaker who makes an utterance in a second language different from the first language, and includes: detecting, from sounds that are input to audio input unit 21, a speech segment in which the first speaker or the second speaker has made an utterance; after performing speech recognition on the utterance in the speech segment detected, displaying on a display a translation result obtained by translating the utterance from the first language to the second language or a translation result obtained by translating the utterance from the second language to the first language; and outputting, in the second language via display 27, a message prompting the second speaker to make an utterance after the first speaker has made an utterance, or outputting, in the first language via display 27, a message prompting the first speaker to make an utterance after the second speaker has made an utterance.

The same advantageous effects as obtained by the aforementioned speech translation device 1 can be obtained with the speech translation method.

A recording medium according to the present embodiment is a non-transitory computer-readable recording medium for use in a computer and has a computer program recorded thereon for causing the computer to execute the speech translation method.

The same advantageous effects as obtained by the aforementioned speech translation device 1 can be obtained with the recording medium.

Speech translation device 1 according to the present embodiment further includes priority utterance input unit 24 that, when speech recognition is performed on the utterance made by the first speaker or the second speaker, performs again the speech recognition preferentially on the utterance on which the speech recognition has been performed.

With this, when either the first speaker or the second speaker makes a mistake in making an utterance or when an utterance uncomfortably made is translated in the middle of the utterance, for example, the speaker who has just made an utterance gets priority by operating priority utterance input unit 24. Therefore, the speaker who has just made an utterance can have an opportunity to make an utterance again (can restate what has just been stated). This enables priority utterance input unit 24 to return the process back to speech recognition on an utterance made by one of the first speaker and the second speaker even though the process has already proceeded to speech recognition on an utterance made by the other of the first speaker and the second speaker after the speech recognition performed on the utterance made by one of the speakers. This enables speech translation device 1 to surely obtain an utterance made by the first speaker or the second speaker. It is therefore possible for speech translation device 1 to output a translation result obtained by translating the utterance.

Speech translation device 1 according to the present embodiment further includes: audio input unit 21 to which a voice of the utterance made by the first speaker or the second speaker in the conversation is input; speech recognizer 23 that performs speech recognition on the utterance in the speech segment detected by speech detector 22, to convert the utterance into text; translator 26 that translates the text into which the utterance has been converted by speech recognizer 23, from the first language to the second language or from the second language to the first language; and audio output unit 28 that outputs by voice a result of the translation made by translator 26.

With this, it is possible to firstly perform speech recognition on an utterance that is input and then translate the language of the utterance into another language. In other words, speech translation device 1 is capable of performing the process starting from the obtainment of an utterance in the conversation between the first speaker and the second speaker up to the output of a result obtained by translating the utterance. Therefore, even without any communication with an external server, speech translation device 1 is capable of translating an utterance made by the first speaker and an utterance made by the second speaker one after the other in the conversation between the first speaker and the second speaker. Thus, speech translation device 1 is applicable in the environment where speech translation device 1 has difficulty in communicating with an external server.

In speech translation device 1 according to the present embodiment, utterance instructor 25 outputs, in the first language via display 27, a message prompting the first speaker to make an utterance when speech translation device 1 is activated, and outputs, in the second language via display 27, a message prompting the second speaker to make an utterance after the utterance made by the first speaker is translated from the first language to the second language and a result of the translation is displayed on display 27.

Thus, by registering in advance that the second speaker makes an utterance in the second language after the first speaker has made an utterance in the first language and outputting, in the first language, a message prompting the first speaker to make an utterance when speech translation device 1 is activated, the first speaker is able to start utterance. This inhibits mistranslation caused by the second speaker making an utterance in the second language when speech translation device 1 is activated.

In speech translation device 1 according to the present embodiment, after a start of the translation, utterance instructor 25 causes audio output unit 28 to output, a specified number of times, a voice message for prompting utterance, and after audio output unit 28 has output the voice message the specified number of times, utterance instructor 25 causes display 27 to display a message for prompting utterance.

In this way, by outputting, up to a specified number of times, a voice message for prompting utterance, it is possible to reduce an increase in the energy consumed by speech translation device 1.

Embodiment 2

[Configuration]

A configuration of speech translation device 1*a* according to the present embodiment will be described with reference to FIG. 4.

Figure 4:
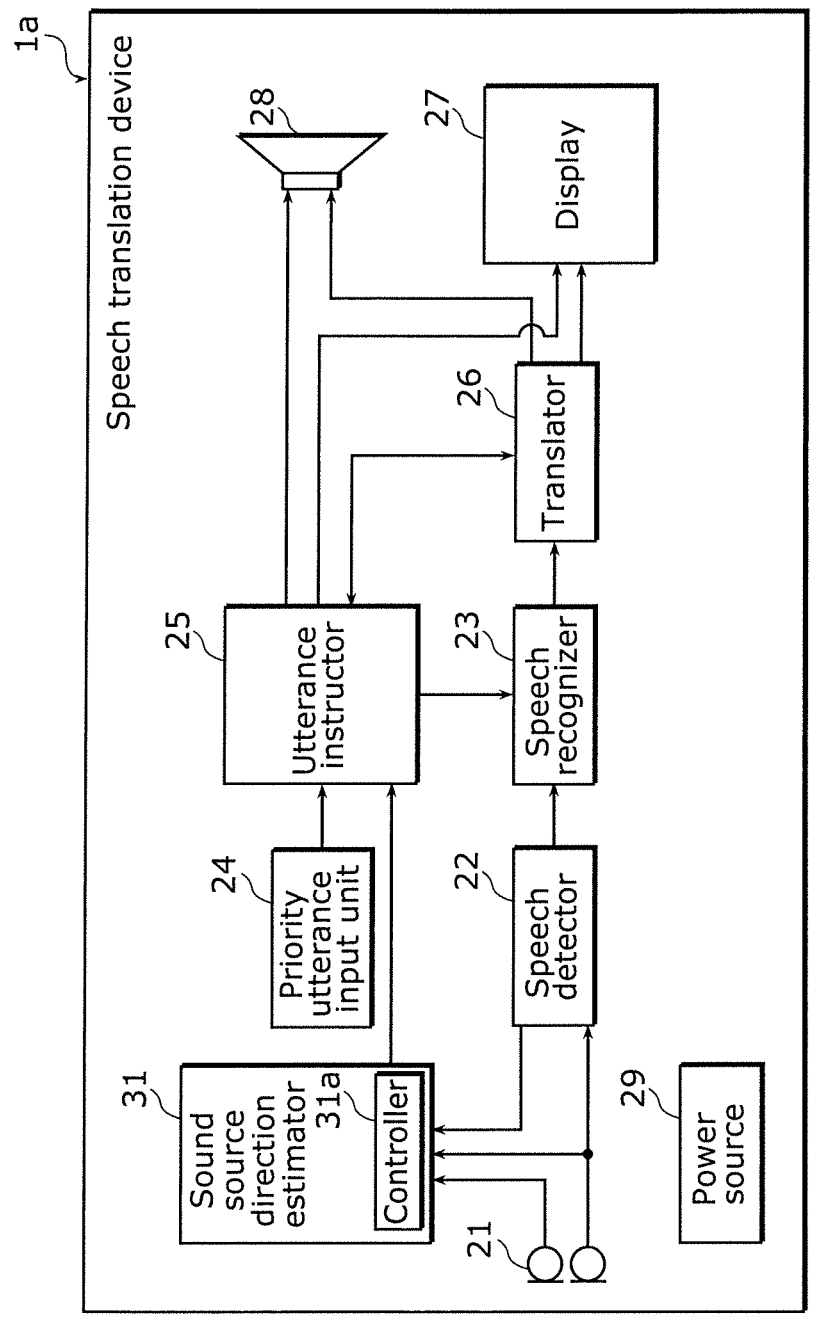
FIG. 4 is a block diagram illustrating a speech translation device according to Embodiment 2.

FIG. 4 is a block diagram illustrating speech translation device 1*a* according to Embodiment 2.

The present embodiment differs from Embodiment 1 in that a sound source direction is estimated.

The other elements included in speech translation device 1*a* according to the present embodiment are the same as those included in speech translation device 1 according to Embodiment 1 unless otherwise stated. The same reference signs are assigned to the same elements as those included in speech translation device 1 and the detailed description of the elements will be omitted.

As illustrated in FIG. 4, speech translation device 1*a* includes a plurality of audio input units 21 and sound source estimator 31 in addition to speech detector 22, priority utterance input unit 24, utterance instructor 25, speech recognizer 23, translator 26, display 27, audio output unit 28, and power source 29.

[Audio Input Units 21]

A plurality of audio input units 21 form a microphone array. Specifically, the microphone array includes at least two microphone units disposed away from each other, obtains a voice, and obtains an acoustic signal obtained by converting the obtained voice into an electrical signal.

Audio input units 21 each outputs the obtained acoustic signal to sound source direction estimator 31. At least one of audio input units 21 outputs the acoustic signal to speech detector 22. According to the present embodiment, one audio input unit 21 is communicably connected to speech detector 22 and outputs the acoustic signal to speech detector 22.

In the present embodiment, speech translation device 1*a* is provided with two audio input units 21, one of which is placed away from the other by a distance that renders a wavelength to be lower than or equal to half the wavelength of a voice.

[Sound Source Direction Estimator 31]

Sound source direction estimator 31 estimates a sound source direction by performing signal processing on a voice that is input to audio input units 21. Specifically, upon obtaining voice information from speech detector 22 and acoustic signals from audio input units 21, sound source direction estimator 31 calculates a time difference (phase difference) between voices that have reached audio input units 21 forming a microphone array and estimates a source sound direction using, for example, a time delay estimation method. In other words, when speech detector 22 detects a speech segment, this means that an utterance made by the first speaker or the second speaker has been input to audio input units 21, and therefore, source sound direction estimator 31 starts estimating a sound source direction, as triggered by the obtainment of the voice information.

Sound source direction estimator 31 outputs, to utterance instructor 25, sound source direction information indicating a sound source direction which is the result of the estimation.

[Utterance Instructor 25]

Utterance instructor 25 includes controller 31a that controls a mode in which display 27 displays. Specifically, controller 31a causes display 27 to display the first language in a display area corresponding to the location of the first speaker with respect to speech translation device 1a and to display the second language in a display area corresponding to the location of the second speaker with respect to speech translation device 1a. As illustrated in FIG. 1A, the display area of display 27 which corresponds to the location of the first speaker is, for example, a display area of display 27 on the side of the first speaker, which displays a text in Japanese. The display area of display 27 which corresponds to the location of the second speaker is, for example, a display area of display 27 on the side of the second speaker, which displays a text in English.

Controller 31a compares a sound source direction estimated by sound source direction estimator 31 and a display direction which is a direction from display 27 of speech translation device 1a to the first speaker or the second speaker and is a direction for either of the display areas of display 27. When the display direction substantially coincides with the estimated sound source direction, controller 31a causes speech recognizer 23 and translator 26 to operate. When the first speaker makes an utterance, for example, a first text indicating the utterance that is made by the first speaker and is input to speech translation device 1a is displayed in the display area on the side of the first speaker (or on the side facing the first speaker). In this case, a display direction is a direction from display 27 to the first speaker, and the sound source direction estimated by sound source direction estimator 31 is also the direction from display 27 to the first speaker.

In contrast, when the display direction is different from the estimated sound source direction, controller 31a causes speech recognizer 23 and translator 26 to stop. When the first speaker makes an utterance and a first text indicating the utterance made by the first speaker is displayed in the display area on the side of the first speaker, if the sound source direction estimated by sound source direction estimator 31 is a direction from display 27 to the second speaker, the display direction does not coincide with the estimated sound source direction. This applies, for example, to the case where the first speaker makes an utterance and subsequently utters another utterance without operating priority utterance input unit 24 or the case where audio input unit 21 collects the surrounding sound which is unrelated to conversation.

When controller 31a causes speech recognizer 23 and translator 26 to stop, utterance instructor 25 outputs again a message prompting utterance in a specified language. When the display direction does not coincide with the estimated sound source direction, for example, it is unknown which of the speakers has made an utterance. Accordingly, speech recognizer 23 does not know whether to perform speech recognition on the utterance in the first language or in the second language. When the first speaker makes an utterance and speech recognizer 23 fails to perform speech recognition on the utterance, translator 26 is unable to translate the utterance. Accordingly, controller 31a causes speech recognizer 23 and translator 26 to stop.

[Operation]

An operation performed by speech translation device 1a configured as above will be described with reference to FIG. 5.

Figure 5:
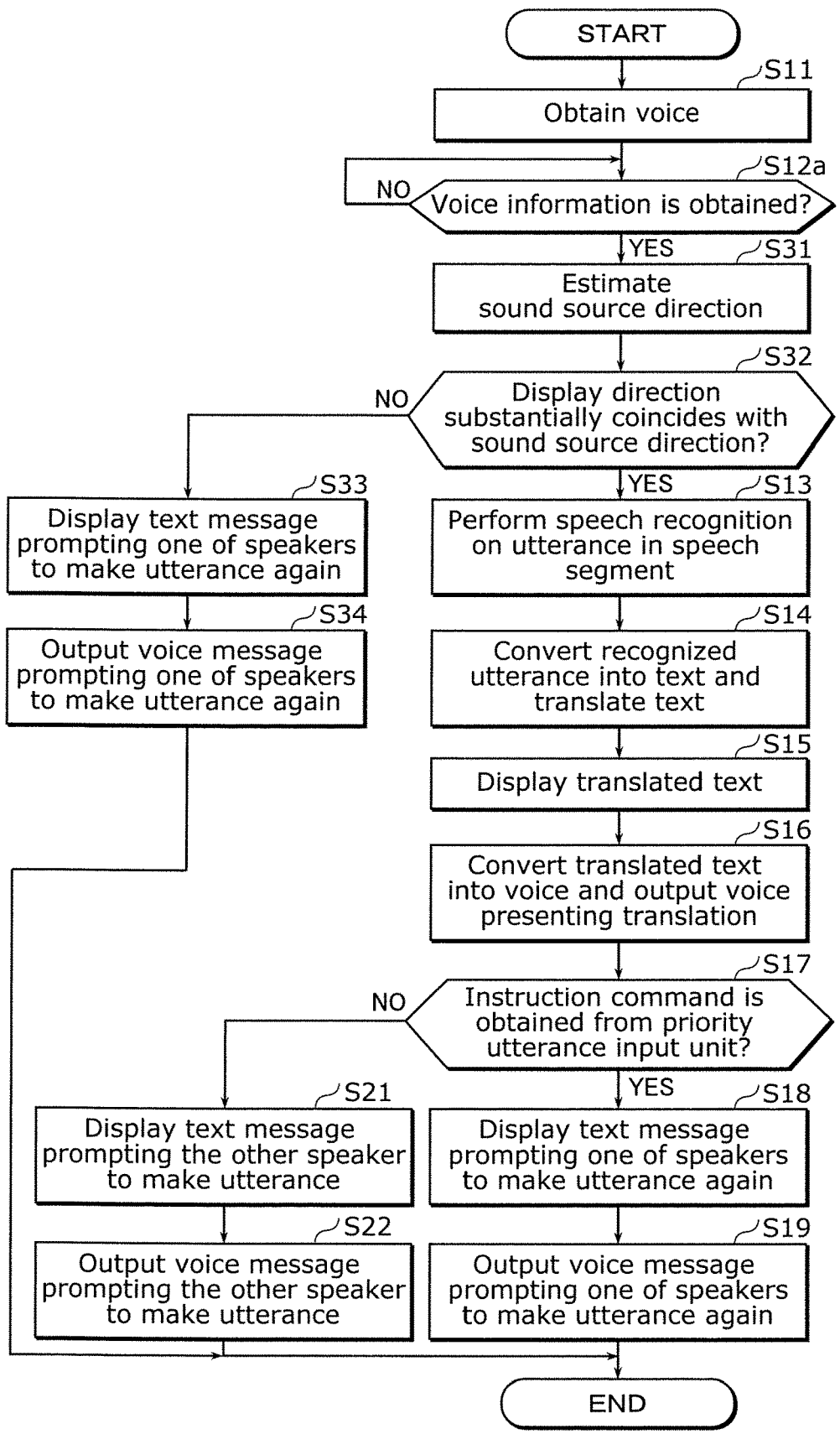
FIG. 5 is a flowchart illustrating an operation of the speech translation device according to Embodiment 2.

FIG. 5 is a flowchart illustrating the operation performed by speech translation device 1a according to Embodiment 2.

The same reference signs are assigned to the same processes as those described in FIG. 3, and the description of the processes is omitted where necessary.

Speech translation device 1a obtains a voice (S11) and generates an acoustic signal indicating the obtained voice.

Next, sound source direction estimator 31 determines whether voice information is obtained from speech detector 22 (S12a).

When sound source direction estimator 31 does not obtain the voice information from speech detector 22 (NO in S12a), since it is the case where speech detector 22 is unable to detect an utterance from the acoustic signal, sound source direction estimator 31 is unable to obtain the voice information. In other words, this is the case where the first speaker and the second speaker are not having a conversation. In this case, the process in step S12a is repeated.

When sound source direction estimator 31 obtains the voice information from speech detector 22 (YES in S12a), this is the case where at least one of the first speaker and the second speaker has made an utterance. In this case, sound source direction estimator 31 calculates a time difference (phase difference) between the utterances included in the acoustic signals obtained from audio input units 21, and estimates a sound source direction (S31). Sound source direction estimator 31 outputs, to utterance instructor 25, sound source direction information indicating the sound source direction resulting from the estimation.

Next, controller 31a of sound source direction estimator 31 determines whether a display direction substantially coincides with the estimated sound source direction (S32).

When the display direction is different from the estimated sound source direction (NO in S32), controller 31a causes speech recognizer 23 and translator 26 to stop. When controller 31a causes speech recognizer 23 and translator 26 to stop, utterance instructor outputs again a message prompting utterance in a specified language.

Specifically, utterance instructor 25 outputs, to display 27, utterance instructing text information indicating a message prompting one of the speakers to make an utterance. Display 27 displays the utterance instructing text information obtained from utterance instructor 25 (S33).

Utterance instructor 25 also outputs, to audio output unit 28, utterance instructing voice information indicating a message prompting one of the speakers to make an utterance. Audio output unit 28 outputs by voice the utterance instructing voice information obtained from utterance instructor 25 (S34).

Speech translation device 1a then ends the operation. Thus, with one of the speakers making an utterance again, speech translation device 1a starts the process from step S11.

When the display direction substantially coincides with the estimated sound source direction (YES in S32), controller 31a causes speech recognizer 23 and translator 26 to operate. Speech translation device 1a then proceeds to step S13 and performs the same processing as that described in FIG. 3.

[Advantageous Effects]

The following describes the advantageous effects obtained with speech translation device 1a according to the present embodiment.

As described above, speech translation device 1a according to the present embodiment is provided with a plurality of audio input units 21. Speech translation device 1a further includes sound source direction estimator 31 that estimates a sound source direction by performing signal processing on a voice that is input to the plurality of audio input units 21, and controller 31a that causes display 27 to display the first language in a display area corresponding to the location of the first speaker with respect to speech translation device 1a and causes display 27 to display the second language in a display area corresponding to the location of the second speaker with respect to speech translation device 1a. Controller 31a compares a sound source direction estimated by sound source direction estimator 31 and a display direction which is a direction from display 27 of speech translation device 1a to the first speaker or the second speaker and is a direction for either of the display areas of display 27. When the display direction substantially coincides with the sound source direction estimated, controller 31a causes speech recognizer 23 and translator 26 to operate, and when the display direction is different from the sound source direction estimated, controller 31a causes speech recognizer 23 and translator 26 to stop.

Thus, when a display direction of a language displayed in a display area of display 27 substantially coincides with a sound source direction of the voice of an utterance made by a speaker, it is possible to specify whether the speaker is the first speaker who makes an utterance in the first language or the second speaker who makes an utterance in the second language. In this case, it is possible to perform speech recognition in the first language on an utterance made by the first speaker and perform speech recognition in the second language on an utterance made by the second speaker. When the display direction is different from the sound source direction, by stopping the translation of an input utterance, it is possible to inhibit the input utterance from being untranslated or mistranslated.

This enables speech translation device 1a to surely perform speech recognition on an utterance made in the first language or an utterance made in the second language, and this in turn makes it possible to surely translate the utterance. As a result, speech translation device 1a is capable of reducing an increase in the amount of processing performed by speech translation device 1a by inhibiting mistranslation, for instance.

In speech translation device 1a according to the present embodiment, when controller 31a causes speech recognizer 23 and translator 26 to stop, utterance instructor 25 outputs again a message prompting utterance in a specified language.

In this way, even when a display direction is different from a sound source direction, with utterance instructor 25 outputting again a message prompting utterance, a target speaker makes an utterance. This enables speech translation device 1a to surely obtain the utterance made by the target speaker, and therefore, speech translation device 1a is capable of more surely translating the utterance.

The same advantageous effects as obtained by speech translation device 1 according to Embodiment 1 can be also obtained with speech translation device 1a according to the present embodiment.

Variation of Embodiment 2

The other elements included in speech translation device 1a according to the present embodiment are the same as those included in speech translation device 1 according to Embodiment 1 unless otherwise stated. The same reference signs are assigned to the same elements as those included in speech translation device 1 and the detailed description of the elements will be omitted.

An operation performed by speech translation device 1a configured as above will be described with reference to FIG. 6.

Figure 6:
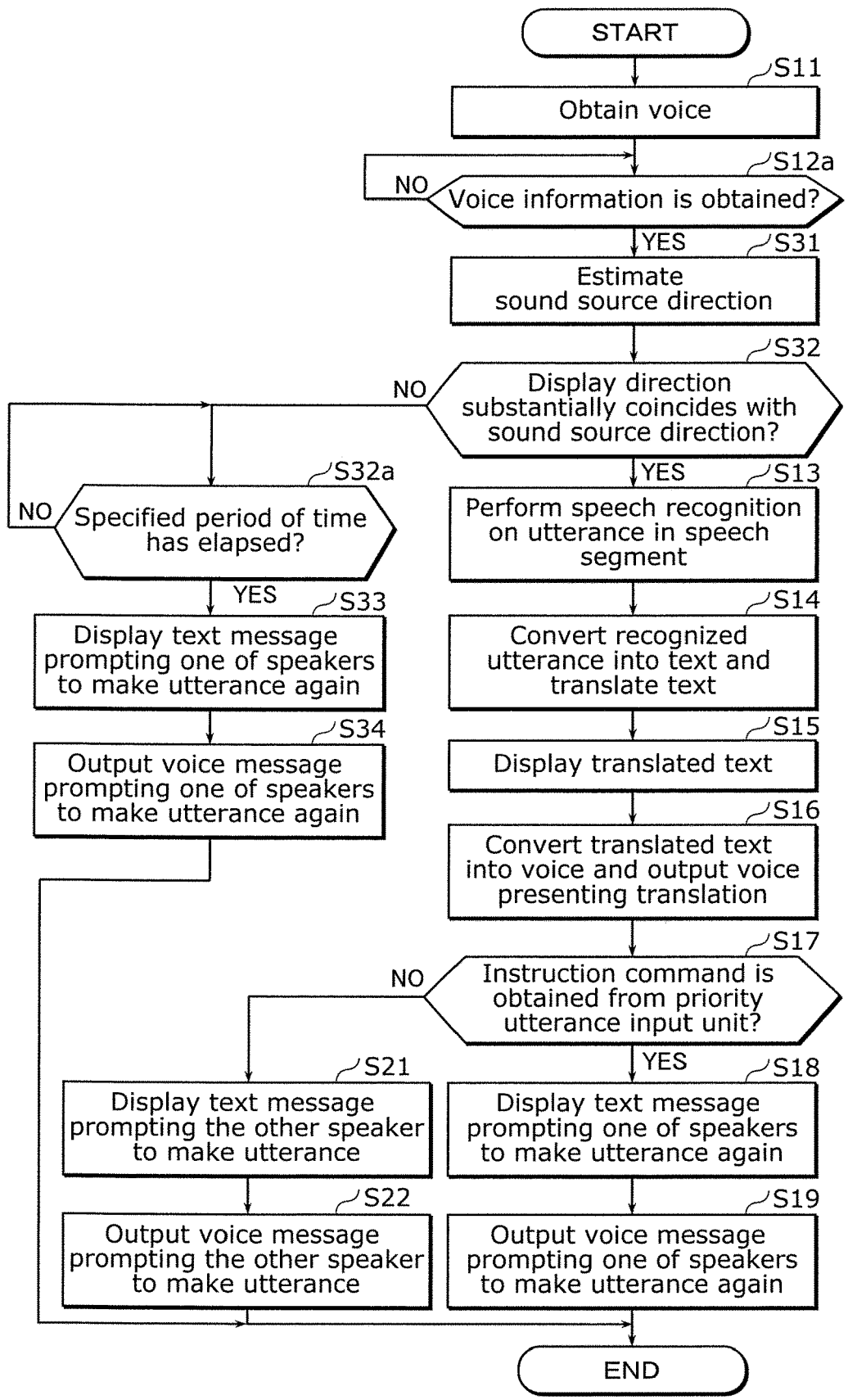
FIG. 6 is a flowchart illustrating an operation of a speech translation device according to a variation of Embodiment 2.

FIG. 6 is a flowchart illustrating the operation performed by speech translation device 1a according to a variation of Embodiment 2.

The same reference signs are assigned to the same processes as those described in FIG. 5, and the description of the processes is omitted where necessary.

In the case of NO in step S32 after going through the processes from steps S11 through S31 in the processes performed by speech translation device 1a, controller 31a determines whether a specified period of time has elapsed after the comparison between the display direction and the sound source direction (S32a).

When the specified period of time has not elapsed after the comparison between the display direction and the sound source direction (NO in S32a), controller 31a returns to step S32a.

When the specified period of time has elapsed after the comparison between the display direction and the sound source direction (YES in S32a), controller 31a proceeds to step S33 and performs the same processing as described in FIG. 5.

Thus, in speech translation device 1a according to the present variation, when a display direction is different from a sound source direction, utterance instructor 25 outputs again a message prompting utterance in a specified language after a specified period of time has elapsed since the comparison made by controller 31a.

Thus, by comparing a display direction and a sound source direction and subsequently allowing a specified period of time to pass, it is possible to inhibit an utterance made by the first speaker and an utterance made by the second speaker from being input in a mixed manner. In this way, by outputting again a message prompting utterance after a specified period of time has elapsed, a target speaker makes an utterance. This enables speech translation device 1a to surely obtain the utterance made by the target speaker, and therefore, speech translation device 1a is capable of more surely translating the utterance.

The same advantageous effects as obtained by speech translation device 1a according to Embodiment 2 can be also obtained with speech translation device 1a according to the present variation.

Embodiment 3

[Configuration]

A configuration of speech translation device 1b according to the present embodiment will be described with reference to FIG. 7.

Figure 7:
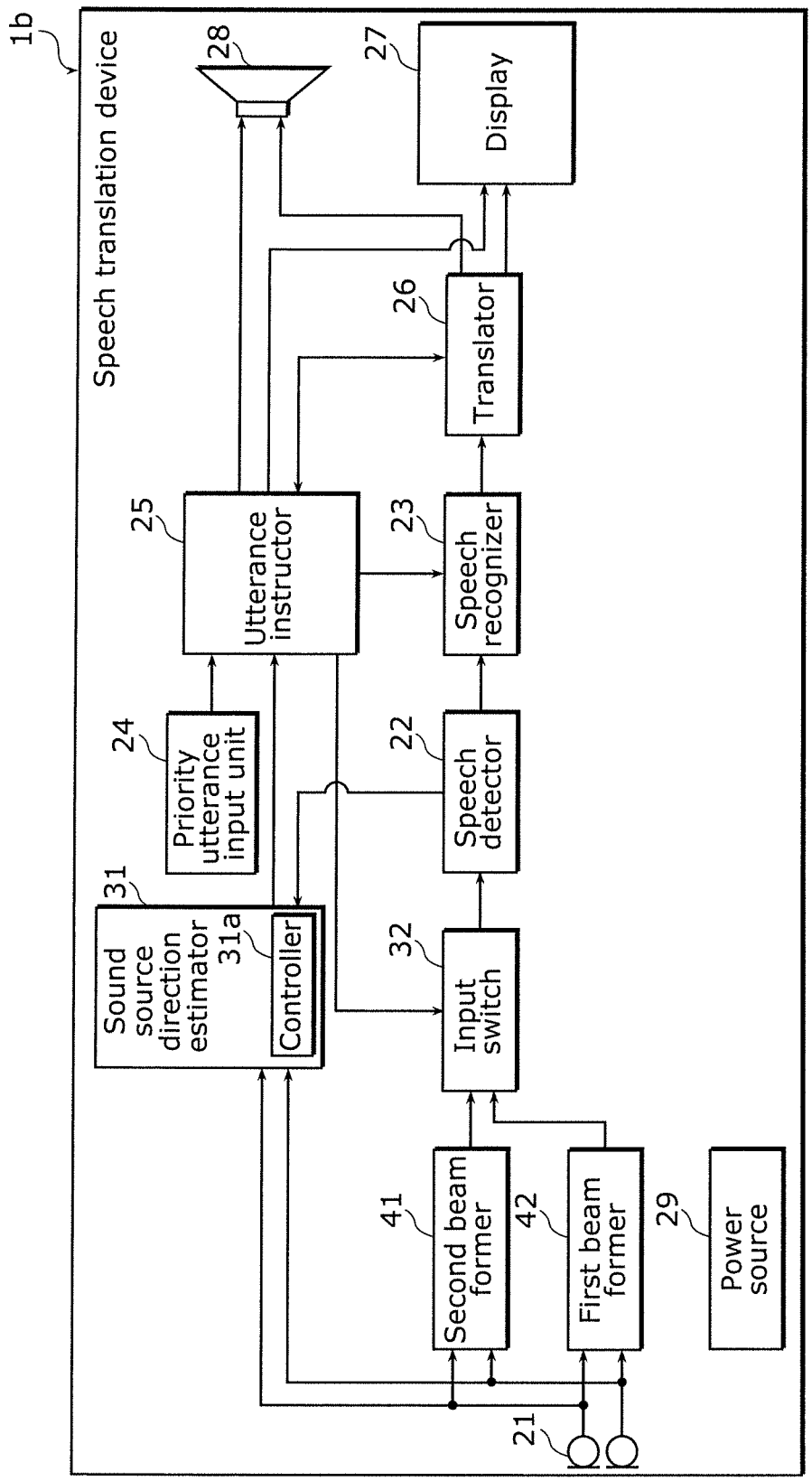
FIG. 7 is a block diagram illustrating a speech translation device according to Embodiment 3.

FIG. 7 is a block diagram illustrating speech translation device 1b according to Embodiment 3.

The present embodiment differs from, for instance, Embodiment 1 in that a sound source direction is estimated. The other elements included in speech translation device 1b according to the present embodiment are the same as those included in speech translation device 1 according to Embodiment 1 unless otherwise stated. The same reference signs are assigned to the same elements as those included in speech translation device 1 and the detailed description of the elements will be omitted.

Speech translation device 1b includes a plurality of audio input units 21, first beam former 41, second beam former 42, and input switch 32 in addition to speech detector 22, priority utterance input unit 24, utterance instructor 25, speech recognizer 23, translator 26, display 27, audio output unit 28, power source 29, and sound source direction estimator 31.

[Audio Input Units 21]

A plurality of audio input units 21 form a microphone array. Audio input units 21 each outputs an obtained acoustic signal to first beam former 41 and second beam former 42. The present embodiment describes an example of using two audio input units 21.

[First Beam Former 41 and Second Beam Former 42]

First beam former 41 causes the directivity of sound collection to coincide with the sound source direction of an utterance made by the first speaker by performing signal processing on the acoustic signal of a voice that is input to at least one of audio input units 21. Second beam former 42 causes the directivity of sound collection to coincide with the sound source direction of an utterance made by the second speaker by performing signal processing on the acoustic signal of the voice that is input to at least one of audio input units 21. In the present embodiment, first beam former 41 and second beam former 42 each performs signal processing on an acoustic signal obtained from each of audio input units 21.

Each of first beam former 41 or second beam former 42 thus inhibits the input of a sound other than a sound received from a predetermined direction by causing the directivity of sound collection to coincide with the predetermined direction. The predetermined direction is, for example, a sound source direction of an utterance made by the first speaker or the second speaker.

In the present embodiment, first beam former 41 is placed on the side of the first speaker and is communicably connected to each of audio input units 21, and second beam former 42 is placed on the side of the second speaker and is communicably connected to each of audio input units 21. Each of first beam former 41 and second beam former 42 outputs, to input switch 32, an acoustically-processed signal which is a result of performing signal processing on the acoustic signal obtained from each of audio input units 21.

[Utterance Instructor 25]

Utterance instructor 25 causes input switch 32 to switch between obtaining an output signal from first beam former 41 and obtaining an output signal from second beam former 42. Specifically, upon obtaining, from sound source direction estimator 31, sound source direction information indicating the sound source direction resulting from the estimation, utterance instructor 25 compares the sound source direction indicated in the sound source direction information and a predetermined direction to which the directivity of sound collection is controlled by a beam former. Utterance instructor 25 selects a beam former of which the predetermined direction substantially coincides with or approximates to the sound source direction.

Utterance instructor 25 outputs a switching command to input switch 32 to cause the selected beam former, either first beam former 41 or second beam former 42, to output an output signal.

[Input Switch 32]

Input switch 32 is a device that obtains an output signal from first beam former 41 or an output signal from second beam former 42 and switches between the output signals to be output to speech detector 22. Input switch 32 is a device that switches between obtaining an output signal from first beam former 41 and obtaining an output signal from second beam former 42. Specifically, upon obtaining a switching command from utterance instructor 25, input switch 32 switches from an output signal from first beam former 41 to an output signal from second beam former 42 or vice versa. With the switching command obtained, input switch 32 outputs, to speech detector 22, an output signal from first beam former 41 or an output signal from second beam former 42.

Input switch 32 is communicably connected to first beam former 41, second beam former 42, speech detector 22, and utterance instructor 25.

[Operation]

An operation performed by speech translation device 1b configured as above will be described with reference to FIG. 8.

Figure 8:
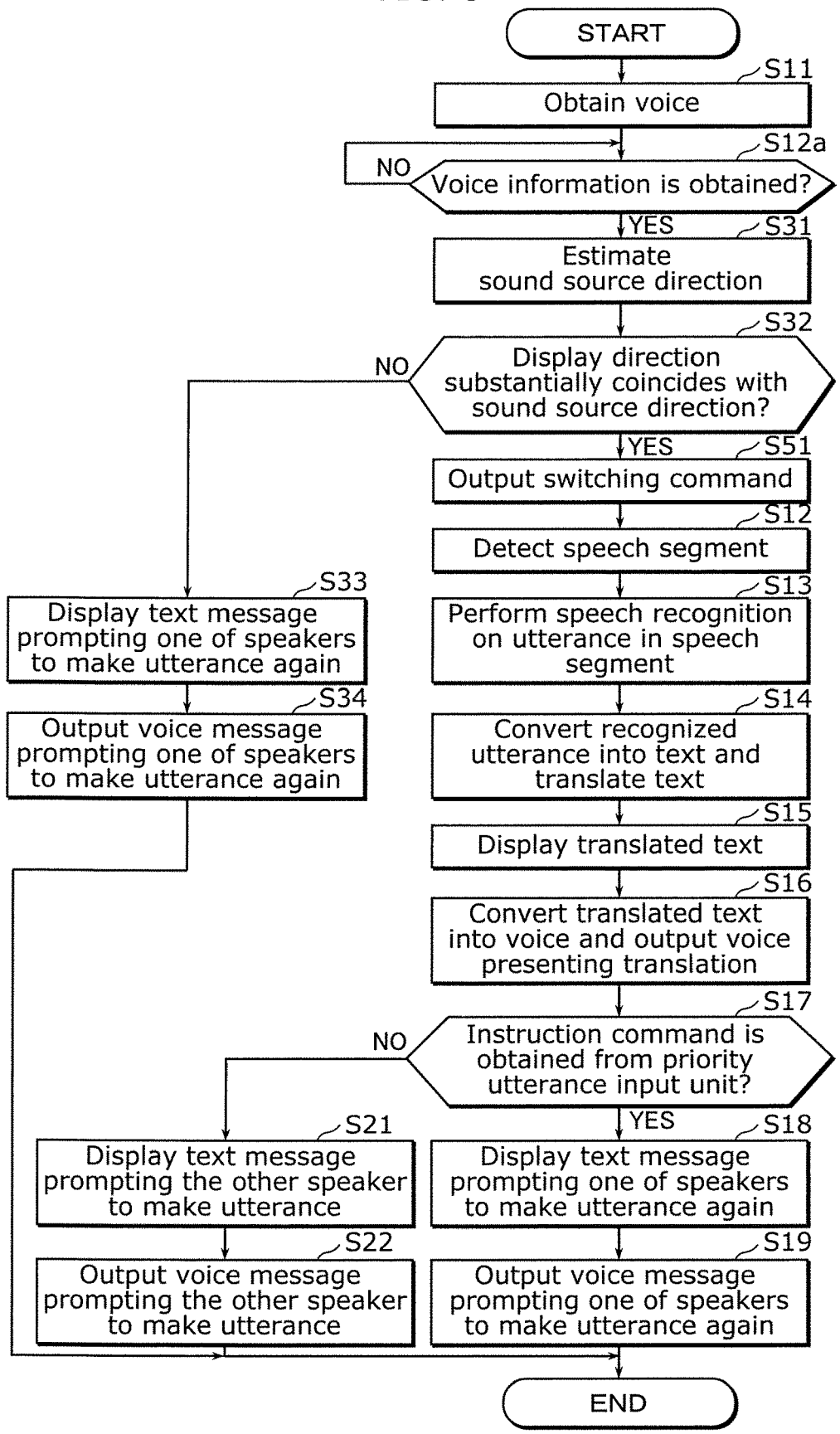
FIG. 8 is a flowchart illustrating an operation of the speech translation device according to Embodiment 3.

FIG. 8 is a flowchart illustrating the operation performed by speech translation device 1b according to Embodiment 3.

The same reference signs are assigned to the same processes as those described in FIG. 5, and the description of the processes is omitted where necessary.

When controller 31a determines that the display direction substantially coincides with the estimated sound source direction in step S32 (YES in S32) after going through steps S11, S12a, and S31 in the processes performed by speech translation device 1b, utterance instructor 25 outputs a switching command to input switch 32 (S51), as illustrated in FIG. 8.

Specifically, when an utterance made by the first speaker or the second speaker is input to two audio input units 21, first beam former 41 has higher sensitivity to an utterance made by the first speaker than an utterance made by the second speaker and second beam former 42 has higher sensitivity to an utterance made by the second speaker than an utterance made by the first speaker.

Accordingly, when a display direction is directed to a display area of display 27 on the side of the first speaker, first beam former 41 has higher sensitivity to an utterance made by the first speaker. Therefore, utterance instructor 25 outputs, to input switch 32, a switching command to output an output signal from first beam former 41. In this case, upon obtaining the switching command, input switch 32 outputs an output signal from first beam former 41.

When a display direction is directed to a display area of display 27 on the side of the second speaker, second beam former 42 has higher sensitivity to an utterance made by the second speaker. Therefore, utterance instructor 25 outputs, to input switch 32, a switching command to output an output signal from second beam former 42. In this case, upon obtaining the switching command, input switch 32 outputs an output signal from second beam former 42.

Speech translation device 1b then proceeds to step S12 and performs the same processing as that described in FIG. 5.

[Advantageous Effects]

The following describes the advantageous effects obtained by speech translation device 1b according to the present embodiment.

As described above, speech translation device 1b is provided with a plurality of audio input units 21. Speech translation device 1b further includes: first beam former 41 that performs signal processing on a voice that is input to at least one of the plurality of audio input units 21, to cause directivity of sound collection to coincide with a sound source direction of the utterance made by the first speaker; second beam former 42 that performs signal processing on the voice that is input to at least one of the plurality of audio input units 21, to cause directivity of sound collection to coincide with a sound source direction of the utterance made by the second speaker; input switch 32 that switches between obtaining an output signal from first beam former 41 and obtaining an output signal from second beam former 42; and sound source direction estimator 31 that estimates a sound source direction by performing signal processing on the voice that is input to the plurality of audio input units 21. Utterance instructor 25 causes input switch 32 to switch between the obtaining of an output signal from first beam former 41 and the obtaining of an output signal from second beam former 42. Utterance instructor 25 then causes input switch 32 to switch between obtaining an output signal from first beam former 41 and obtaining an output signal from second beam former 42.

In this way, sound source direction estimator 31 is capable of estimating a relative direction in which a speaker is located with respect to speech translation device 1b. This enables input switch 32 to switch to either an output signal from first beam former 41 or an output signal from second beam former 42 that is appropriately directed to a speaker. In other words, since it is possible to cause the directivity of sound collection by a beam former to coincide with a sound source direction of an utterance made by the first speaker or the second speaker, speech translation device 1b is capable of reducing the surrounding noise to collect the sound of the utterance.

The same advantageous effects as obtained by speech translation device 1 according to Embodiment 1 can be also obtained with speech translation device 1b according to the present embodiment.

Variation of Embodiment 3

A configuration of speech translation device 1c according to the present embodiment will be described with reference to FIG. 9.

Figure 9:
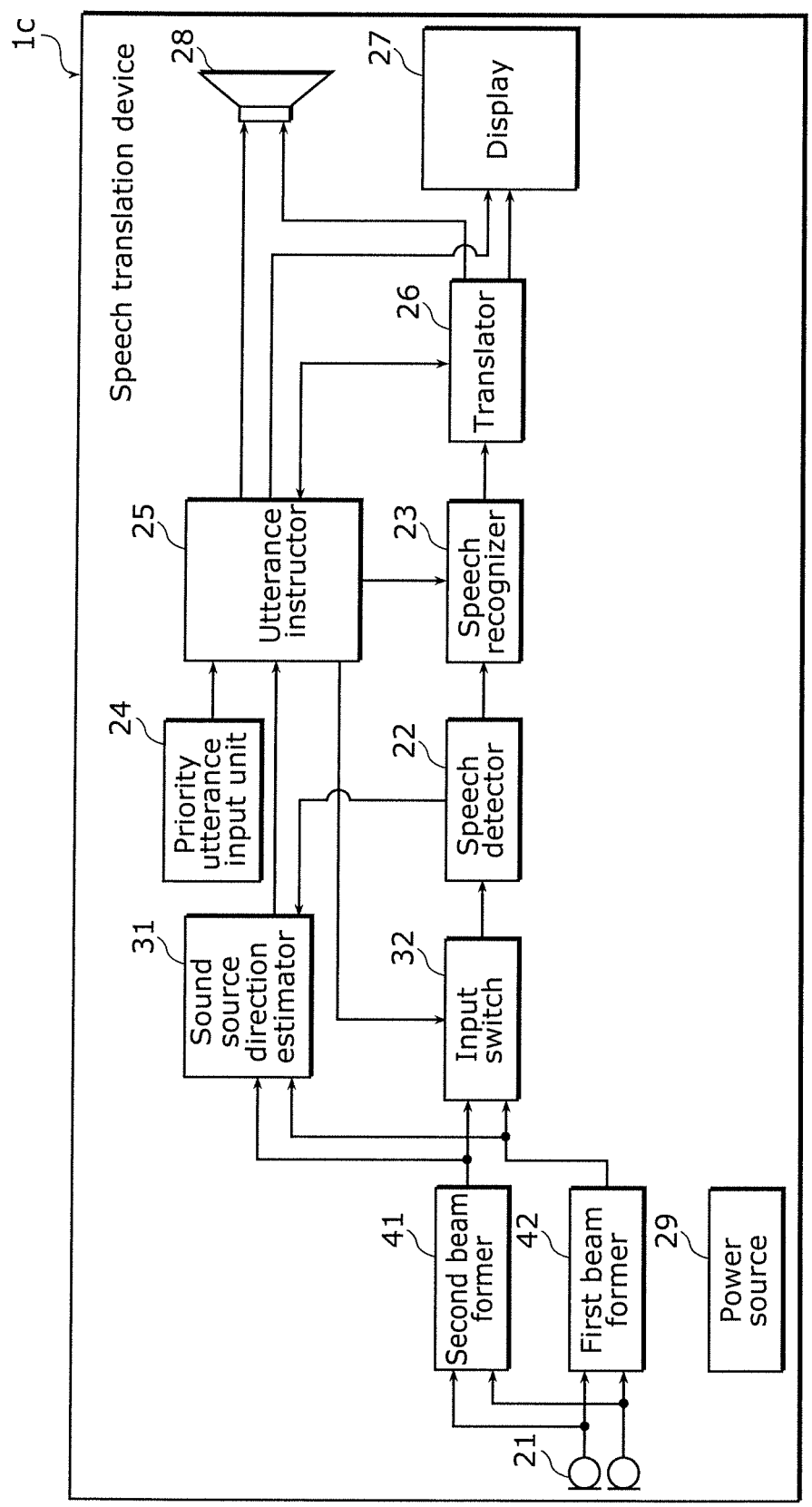
FIG. 9 is a block diagram illustrating a speech translation device according to a variation of Embodiment 3.

FIG. 9 is a block diagram illustrating speech translation device 1c according to a variation of Embodiment 3.

The other elements included in speech translation device 1c according to the present variation are the same as those included in speech translation device 1 according to Embodiment 1 unless otherwise stated. The same reference signs are assigned to the same elements as those included in speech translation device 1 and the detailed description of the elements will be omitted.

As illustrated in FIG. 9, first beam former 41 and second beam former 42 each are communicably connected to each of audio input units 21 as well as sound source direction estimator 31 and input switch 32.

An acoustic signal from each of audio input units 21 is input to first beam former 41 and second beam former 42. By performing signal processing on each acoustic signal that has been input, each of first beam former 41 and second beam former 42 outputs, to sound source direction estimator 31 and input switch 32, each of the acoustically-processed signals which is a result of the signal processing.

In other words, according to the present variation, each of audio input units 21 is communicably connected to first beam former 41 and second beam former 42 but not communicably connected to sound source direction estimator 31.

In this way, an acoustic signal, having the directivity of sound collection which is enhanced by first beam former 41 or second beam former 42 so that the directivity coincides with the sound source direction of an utterance made by a speaker, is input to sound source direction estimator 31.

Such speech translation device 1c according to the present variation is provided with a plurality of audio input units 21. Speech translation device 1c further includes: first beam former 41 that performs signal processing on a voice that is input to at least one of the plurality of audio input units 21, to cause directivity of sound collection to coincide with a sound source direction of the utterance made by the first speaker; second beam former 42 that performs signal processing on the voice that is input to at least one of the plurality of audio input units 21, to cause directivity of sound collection to coincide with a sound source direction of the utterance made by the second speaker; input switch 32 that switches between obtaining an output signal from first beam former 41 and obtaining an output signal from second beam former 42; and sound source direction estimator 31 that estimates a sound source direction by performing signal processing on the voice that is input to the plurality of audio input units 21. Utterance instructor 25 causes input switch 32 to switch between the obtaining of an output signal from first beam former 41 and the obtaining of an output signal from second beam former 42.

In this way, sound source direction estimator 31 is capable of estimating a relative direction in which a speaker is located with respect to speech translation device 1c. This enables sound source direction estimator 31 to perform signal processing on an output signal from first beam former 41 or an output signal from second beam former 42 that is appropriately directed to a speaker. It is therefore possible to reduce computational cost required for the signal processing.

The same advantageous effects as obtained by speech translation device 1 according to Embodiment 1 can be also obtained with speech translation device 1c according to the present variation.

Embodiment 4

[Configuration]

A configuration of speech translation device 1d according to the present embodiment will be described with reference to FIG. 10.

Figure 10:
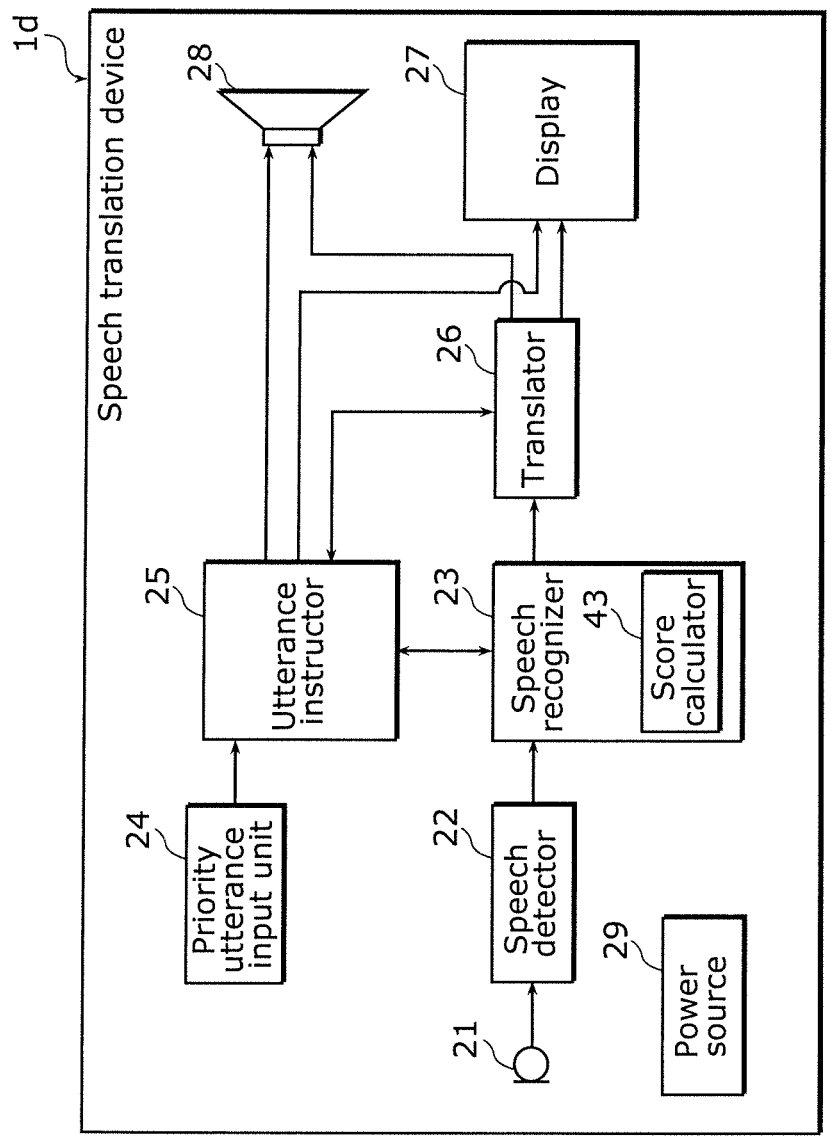
FIG. 10 is a block diagram illustrating a speech translation device according to Embodiment 4.

FIG. 10 is a block diagram illustrating speech translation device 1d according to Embodiment 4.

The present embodiment differs from Embodiment 1, for instance, in that speech translation device 1d includes score calculator 43.

The other elements included in speech translation device 1d according to the present embodiment are the same as those included in speech translation device 1 according to Embodiment 1 unless otherwise stated. The same reference signs are assigned to the same elements as those included in speech translation device 1 and the detailed description of the elements will be omitted.

As illustrated in FIG. 10, speech recognizer 23 in speech translation device 1d includes score calculator 43.

[Score Calculator 43]

After speech recognition has been performed on an utterance, score calculator 43 calculates a reliability score of the result of the speech recognition and outputs the calculated reliability score to utterance instructor 25. A reliability score indicates accuracy (degree of similarity) of speech recognition when speech recognition is performed on an utterance indicated in voice information obtained from speech detector 22. For example, score calculator 43 compares a text into which the utterance indicated in the voice information has been converted and the utterance indicated in the voice information, and calculates a reliability score indicating the degree of similarity between the text and the utterance.

Note that score calculator 43 does not need to be included in speech recognizer 23 and may be another device separate from speech recognizer 23.

[Utterance Instructor 25]

Utterance instructor 25 determines the accuracy of speech recognition performed on an utterance, by evaluating a reliability score obtained from score calculator 43 in speech recognizer 23. Specifically, utterance instructor 25 determines whether the reliability score obtained from score calculator 43 is lower than or equal to a threshold. When the reliability score is lower than or equal to the threshold, utterance instructor 25 outputs a message prompting utterance via at least either display 27 or audio output unit 28, without translating the utterance whose reliability score is lower than or equal to the threshold. When the reliability score is higher than the threshold, utterance instructor 25 translates the utterance.

[Operation]

An operation performed by speech translation device 1d configured as above will be described with reference to FIG. 11.

FIG. 11 is a flowchart illustrating the operation of speech translation device 1d according to Embodiment 4.

The same reference signs are assigned to the same processes as those described in FIG. 3, and the description of the processes is omitted where necessary.

After going through steps S11 through S13 in the processes performed by speech translation device 1d, score calculator 43 in speech recognizer 23 calculates a reliability score of the result of the speech recognition and outputs the calculated reliability score to utterance instructor 25 (S61).

Next, upon obtaining the reliability score from score calculator 43, utterance instructor 25 determines whether the obtained reliability score is lower than or equal to a threshold (S62).

When the reliability score is lower than or equal to the threshold (YES in S62), utterance instructor 25 outputs again utterance instructing text information which is a message prompting utterance, without translating the utterance whose reliability score is lower than or equal to the threshold (S18). Speech translation device 1d then proceeds to step S19 and performs the same processing as that described in FIG. 3, for instance.

When the reliability score is higher than the threshold (NO in S62), utterance instructor 25 proceeds to step S14 and performs the same processing as described in FIG. 3, for instance.

[Advantageous Effects]

The following describes the advantageous effects obtained by speech translation device 1d according to the present embodiment.

As described above, in speech translation device 1d according to the present embodiment, speech recognizer 23 outputs a result of speech recognition and the reliability score of the result. When the reliability score obtained from speech recognizer 23 is lower than or equal to a threshold, utterance instructor 25 outputs, via at least one of display 27 or audio output unit 28, a message prompting utterance, without translating the utterance whose reliability score is lower than or equal to the threshold.

In this way, when a reliability score indicating the accuracy of speech recognition is lower than or equal to a threshold, with utterance instructor 25 outputting again a message prompting utterance, a target speaker makes an utterance again. This enables speech translation device 1d to surely obtain the utterance made by the target speaker, and therefore, speech translation device 1d is capable of more surely translating the utterance.

If audio output unit 28 outputs a message prompting utterance by voice, in particular, a speaker easily notices that speech recognition has not been performed properly on an utterance he/she has made.

The same advantageous effects as obtained by speech translation device 1 according to Embodiment 1 can be also obtained with speech translation device 1d according to the present embodiment.

Other Variations Etc.

Although the above has described the present disclosure based on Embodiments 1 through 4 and the variations of Embodiments 2 and 3, the present disclosure is not limited to these embodiments and variations.

For example, with the speech translation device, the speech translation method, and the recording medium according to each of the aforementioned Embodiments 1 through 4 and variations of Embodiments 2 and 3, an utterance made by each of the first speaker and one or more second speakers may be saved in a cloud server by transmitting the utterance via the cloud server or only the first text or the second text resulting from the recognition of each utterance may be saved in the cloud server by transmitting the text via the network.

According to the speech translation device, the speech translation method, and the recording medium according to each of the aforementioned Embodiments 1 through 4 and variations of Embodiments 2 and 3, speech recognizer and a translator may not be installed in the speech translation device. In this case, the speech recognizer and the translator each may be an engine mounted in a cloud server. The speech translation device may transmit obtained voice information to the cloud server or obtain, from the cloud server, a text, a translated text, and a translation voice which are the result of the speech recognition and translation performed by the cloud server based on voice information.

The speech translation method according to each of the aforementioned Embodiments 1 through 4 and variations of Embodiments 2 and 3 may be realized by a program for use in a computer and such a program may be stored in storage.

Each of processing units included in the speech translation device, the speech translation method, and the program according to each of the aforementioned Embodiments 1 through 4 and variations of Embodiments 2 and 3 is typically realized as an LSI which is an integrated circuit. These circuits may be individually realized as one chip or may be realized as one chip including part or all of the circuits.

Each of the processing units to be realized as an integrated circuit is not limited to an LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that in each of the aforementioned Embodiments 1 through 4 and variations of Embodiments 2 and 3, each element may be configured by dedicated hardware or may be realized by executing a software program suitable for each element. Each of the elements may be implemented by a program executor such as a CPU or a processor reading and executing a software program recorded on a recording medium such as a hard disc or a semiconductor memory.

All the numbers used above are exemplary numbers to specifically describe the present disclosure, and the aforementioned Embodiments 1 through 4 and variations of Embodiments 2 and 3 according to the present disclosure are not limited to the illustrated numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order to execute each step in the flowchart is an exemplary order for specifically describing the present disclosure, and may be other than the above-described order. Furthermore, part of the above-described steps may be executed at the same time as (in parallel to) the execution of other steps.

Forms obtained by various modifications to each of the foregoing Embodiments 1 through 4 and the variations of Embodiments 2 and 3 that can be conceived by a person skilled in the art as well as forms realized by combining elements and functions of different embodiments and variations within the scope of the essence of the present disclosure are included in one or multiple aspects of the present disclosure.

The herein disclosed subject matters are to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is applicable to a speech translation device, a speech translation method, and a recording medium which are used for facilitating communication through conversation among speakers speaking different languages.

The invention claimed is:

1. A speech translation device for conversation between a first speaker and a second speaker, the first speaker making an utterance in a first language, the second speaker making an utterance in a second language different from the first language, the speech translation device comprising:
   a speech detector that detects, from sounds that are input to an audio input unit, a speech segment in which the first speaker or the second speaker has made an utterance;
   a display that, after speech recognition is performed on the utterance in the speech segment detected by the speech detector, displays a translation result obtained by translating the utterance from the first language to the second language or a translation result obtained by translating the utterance from the second language to the first language;
   an utterance circuit that outputs, in the second language via the display, a message prompting the second speaker to make an utterance after the first speaker has made an utterance or outputs, in the first language via the display, a message prompting the first speaker to make an utterance after the second speaker has made an utterance;
   the audio input unit to which a voice of the utterance made by the first speaker or the second speaker in the conversation is input;
   a speech recognizer that performs speech recognition on the utterance in the speech segment detected by the speech detector, to convert the utterance into text;
   a translator that translates the text into which the utterance has been converted by the speech recognizer, from the first language to the second language or from the second language to the first language; and
   an audio output unit that outputs by voice a result of the translation made by the translator, wherein
   the audio input unit comprises a plurality of audio input units,
   the speech translation device further comprises:
      a first beam former that performs signal processing on a voice that is input to at least one of the plurality of audio input units, to cause directivity of sound collection to coincide with a sound source direction of the utterance made by the first speaker;
      a second beam former that performs signal processing on the voice that is input to at least one of the plurality of audio input units, to cause directivity of sound collection to coincide with a sound source direction of the utterance made by the second speaker; and
      an input switch that switches between obtaining an output signal from the first beam former and obtaining an output signal from the second beam former.

2. The speech translation device according to claim 1, further comprising:
   a priority utterance input unit that, when speech recognition is performed on the utterance made by the first speaker or the second speaker, causes speech recognition to be performed again on the utterance on which the speech recognition has been performed.

3. The speech translation device according to claim 1, wherein
   the utterance circuit:
      outputs, in the first language via the display, the message prompting the first speaker to make an utterance when the speech translation device is activated; and
      outputs, in the second language via the display, the message prompting the second speaker to make an utterance after the utterance made by the first speaker is translated from the first language to the second language and a result of the translation is displayed on the display.

4. The speech translation device according to claim 1, wherein
   after a start of the translation, the utterance circuit causes the audio output unit to output, a specified number of times, a voice message for prompting utterance, and
   after the audio output unit has output the voice message the specified number of times, the utterance circuit causes the display to display a message for prompting utterance.

5. The speech translation device according to claim 1, wherein
   the speech recognizer outputs a result of the speech recognition performed on the utterance and a reliability score of the result, and
   when the reliability score obtained from the speech recognizer is lower than or equal to a threshold, the utterance circuit outputs a message prompting utterance via at least one of the display or the audio output unit, without translating the utterance whose reliability score is lower than or equal to the threshold.

6. The speech translation device according to claim 1, wherein
the speech translation device further comprises a sound source direction estimator that estimates a sound source direction by performing signal processing on the voice that is input to the plurality of audio input units, and
the utterance circuit causes the input switch to switch between the obtaining of an output signal from the first beam former and the obtaining of an output signal from the second beam former.

7. A speech translation device for conversation between a first speaker and a second speaker, the first speaker making an utterance in a first language, the second speaker making an utterance in a second language different from the first language, the speech translation device comprising:
a speech detector that detects, from sounds that are input to an audio input unit, a speech segment in which the first speaker or the second speaker has made an utterance;
a display that, after speech recognition is performed on the utterance in the speech segment detected by the speech detector, displays a translation result obtained by translating the utterance from the first language to the second language or a translation result obtained by translating the utterance from the second language to the first language;
an utterance circuit that outputs, in the second language via the display, a message prompting the second speaker to make an utterance after the first speaker has made an utterance or outputs, in the first language via the display, a message prompting the first speaker to make an utterance after the second speaker has made an utterance;
the audio input unit to which a voice of the utterance made by the first speaker or the second speaker in the conversation is input;
a speech recognizer that performs speech recognition on the utterance in the speech segment detected by the speech detector, to convert the utterance into text;
a translator that translates the text into which the utterance has been converted by the speech recognizer, from the first language to the second language or from the second language to the first language; and
an audio output unit that outputs by voice a result of the translation made by the translator, wherein
the audio input unit comprises a plurality of audio input units,
the speech translation device further comprises:
a sound source direction estimator that estimates a sound source direction by performing signal processing on a voice that is input to the plurality of audio input units; and
a controller that causes the display to display the first language in a display area corresponding to a location of the first speaker with respect to the speech translation device, and display the second language in a display area corresponding to a location of the second speaker with respect to the speech translation device, and
the controller:
compares a display direction and the sound source direction estimated by the sound source direction estimator, the display direction being a direction from the display of the speech translation device to the first speaker or the second speaker and being a direction for either one of the display areas of the display;
causes the speech recognizer and the translator to operate when the display direction substantially coincides with the sound source direction estimated; and
causes the speech recognizer and the translator to stop when the display direction is different from the sound source direction estimated.

8. The speech translation device according to claim 7, further comprising:
a priority utterance input unit that, when speech recognition is performed on the utterance made by the first speaker or the second speaker, causes speech recognition to be performed again on the utterance on which the speech recognition has been performed.

9. The speech translation device according to claim 7, wherein
when the controller causes the speech recognizer and the translator to stop, the utterance circuit outputs again a message prompting utterance in a specified language.

10. The speech translation device according to claim 7, wherein
when the display direction is different from the sound source direction estimated, the utterance circuit outputs again a message prompting utterance in a specified language after a specified period of time has elapsed since the comparison made by the controller.

11. The speech translation device according to claim 7, wherein
the utterance circuit:
outputs, in the first language via the display, the message prompting the first speaker to make an utterance when the speech translation device is activated; and
outputs, in the second language via the display, the message prompting the second speaker to make an utterance after the utterance made by the first speaker is translated from the first language to the second language and a result of the translation is displayed on the display.

12. The speech translation device according to claim 7, wherein
after a start of the translation, the utterance circuit causes the audio output unit to output, a specified number of times, a voice message for prompting utterance, and
after the audio output unit has output the voice message the specified number of times, the utterance circuit causes the display to display a message for prompting utterance.

13. The speech translation device according to claim 7, wherein
the speech recognizer outputs a result of the speech recognition performed on the utterance and a reliability score of the result, and
when the reliability score obtained from the speech recognizer is lower than or equal to a threshold, the utterance circuit outputs a message prompting utterance via at least one of the display or the audio output unit, without translating the utterance whose reliability score is lower than or equal to the threshold.

14. A speech translation method for conversation between a first speaker and a second speaker, the first speaker making an utterance in a first language, the second speaker making an utterance in a second language different from the first language, the speech translation method comprising:

detecting, from sounds that are input to an audio input unit, a speech segment in which the first speaker or the second speaker has made an utterance;

after performing speech recognition on the utterance in the speech segment detected, displaying on a display a translation result obtained by translating the utterance from the first language to the second language or a translation result obtained by translating the utterance from the second language to the first language;

outputting, in the second language via the display, a message prompting the second speaker to make an utterance after the first speaker has made an utterance, or outputting, in the first language via the display, a message prompting the first speaker to make an utterance after the second speaker has made an utterance;

performing speech recognition on the utterance in the speech segment detected, to convert the utterance into text;

translating the text into which the utterance has been converted, from the first language to the second language or from the second language to the first language; and outputting by voice a result of the translation, wherein the audio input unit comprises a plurality of audio input units, and the speech translation method further comprises:

performing signal processing by a first beam former on a voice that is input to at least one of the plurality of audio input units, to cause directivity of sound collection to coincide with a sound source direction of the utterance made by the first speaker;

performing signal processing by a second beam former on the voice that is input to at least one of the plurality of audio input units, to cause directivity of sound collection to coincide with a sound source direction of the utterance made by the second speaker; and switching between obtaining an output signal from the first beam former and obtaining an output signal from the second beam former.

15. The speech translation method according to claim 14, further comprising estimating a sound source direction by performing signal processing on the voice that is input to the plurality of audio input units.

16. A speech translation method for conversation between a first speaker and a second speaker, the first speaker making an utterance in a first language, the second speaker making an utterance in a second language different from the first language, the speech translation method comprising:

detecting, from sounds that are input to an audio input unit, a speech segment in which the first speaker or the second speaker has made an utterance;

after performing speech recognition on the utterance in the speech segment detected, displaying on a display a translation result obtained by translating the utterance from the first language to the second language or a translation result obtained by translating the utterance from the second language to the first language;

outputting, in the second language via the display, a message prompting the second speaker to make an utterance after the first speaker has made an utterance, or outputting, in the first language via the display, a message prompting the first speaker to make an utterance after the second speaker has made an utterance;

performing speech recognition, using a speech recognizer, on the utterance in the speech segment detected, to convert the utterance into text;

translating, using a translator, the text into which the utterance has been converted, from the first language to the second language or from the second language to the first language; and outputting by voice a result of the translation made by the translator, wherein the audio input unit comprises a plurality of audio input units, the speech translation method further comprises:
　estimating a sound source direction by performing signal processing on a voice that is input to the plurality of audio input units; and
　causing the display to display the first language in a display area corresponding to a location of the first speaker with respect to the display, and display the second language in a display area corresponding to a location of the second speaker with respect to the display, and said causing comprises:
　comparing a display direction and the sound source direction estimated, the display direction being a direction from the display to the first speaker or the second speaker and being a direction for either one of the display areas of the display;
　causing the speech recognizer and the translator to operate when the display direction substantially coincides with the sound source direction estimated; and
　causing the speech recognizer and the translator to stop when the display direction is different from the sound source direction estimated.

* * * * *